United States Patent
Song

(10) Patent No.: US 7,010,412 B1
(45) Date of Patent: Mar. 7, 2006

(54) METHOD FOR CALCULATING PARAMETERS IN ROAD DESIGN OF S-TYPE CLOTHOID, COMPLEX CLOTHOID AND EGG TYPE CLOTHOID

(75) Inventor: Gyu-Seok Song, Sungdong-gu (KR)

(73) Assignee: Saman Engineering Consultants Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/015,932

(22) Filed: Dec. 17, 2004

(30) Foreign Application Priority Data

Sep. 24, 2004 (KR) ...................... 10-2004-0079728

(51) Int. Cl.
G09B 25/06 (2006.01)
G06T 17/00 (2006.01)

(52) U.S. Cl. .............................. 701/80; 404/1; 404/17; 404/71; 434/433; 703/2; 701/212; 345/428

(58) Field of Classification Search ................. 37/347; 405/174, 180; 701/207–209, 1, 200, 80, 701/212; 703/13, 2; 404/1, 17, 71, 84.8; 345/50, 56, 428; 434/433; B62D 13/00; G05D 1/03; G06F 17/50
See application file for complete search history.

(56) References Cited

U.S. PATENT DOCUMENTS

| | | | | |
|---|---|---|---|---|
| 2,866,418 A | * | 12/1958 | Petrick, Sr. .................. | 104/305 |
| 3,605,625 A | * | 9/1971 | Mende .......................... | 104/8 |
| 3,729,133 A | * | 4/1973 | Covert ...................... | 238/10 E |
| 3,844,052 A | * | 10/1974 | Frannje et al. ............... | 434/433 |
| 4,361,202 A | * | 11/1982 | Minovitch ................... | 180/168 |
| 5,612,883 A | * | 3/1997 | Shaffer et al. ............... | 701/300 |
| 5,615,116 A | * | 3/1997 | Gudat et al. .................. | 701/23 |
| 5,629,855 A | * | 5/1997 | Kyrtsos et al. ............. | 701/300 |
| 5,640,323 A | * | 6/1997 | Kleimenhagen et al. ....... | 701/1 |
| 5,646,843 A | * | 7/1997 | Gudat et al. ................. | 701/3 |
| 5,646,845 A | * | 7/1997 | Gudat et al. ................. | 701/41 |
| 5,661,650 A | * | 8/1997 | Sekine et al. ................ | 701/82 |
| 5,680,306 A | * | 10/1997 | Shin et al. ................... | 701/213 |
| 5,680,313 A | * | 10/1997 | Whittaker et al. .......... | 701/300 |
| 5,684,696 A | * | 11/1997 | Rao et al. ...................... | 701/25 |
| 5,708,427 A | * | 1/1998 | Bush .......................... | 340/941 |

(Continued)

OTHER PUBLICATIONS

Kuroda et all., "Logarithmic spiral spline interpolant with curvature continuity", Transactions of the Information Processing society of Japan, vol. 39, No. 3, p. 602-9, Mar. 1998, Publisher:Inf. Process. Soc. Japan.*

(Continued)

Primary Examiner—Cuong Nguyen
(74) Attorney, Agent, or Firm—Jordan and Hamburg LLP

(57) ABSTRACT

The present invention relates to a method for calculating parameters in a road design of a S type, a complex type and an egg type clothoid, and in particular to a method for calculating a parameter value capable of determining the size of a clothoid that is inserted when designing a S-shaped and interchange, a connection road, etc. in an egg shape. In the present invention, it is possible to easily calculate the clothoid parameter A in a S shape, complex type and egg type road design, and a road design can be fast finished. In addition, in the present invention, it is possible to achieve an easier design of a S shape and egg type clothoid by determining a design specification without using CAD. The design can be achieved based on a simulation using a center coordinate of two circles for achieving an optimum design.

10 Claims, 18 Drawing Sheets

U.S. PATENT DOCUMENTS

| | | | |
|---|---|---|---|
| 5,838,562 A * | 11/1998 | Gudat et al. | 701/213 |
| 5,909,965 A * | 6/1999 | Szu et al. | 384/43 |
| 5,956,250 A * | 9/1999 | Gudat et al. | 701/26 |
| 6,126,360 A * | 10/2000 | May et al. | 404/14 |
| 6,169,940 B1 * | 1/2001 | Jitsukata et al. | 701/23 |
| 6,175,799 B1 * | 1/2001 | Tsutsumi et al. | 701/96 |
| 6,343,247 B1 * | 1/2002 | Jitsukata et al. | 701/28 |
| 6,366,851 B1 * | 4/2002 | Chojnacki et al. | 701/208 |
| 6,438,494 B1 * | 8/2002 | Yamamoto et al. | 702/5 |
| 6,448,969 B1 * | 9/2002 | Minakawa et al. | 345/428 |
| 6,476,780 B1 * | 11/2002 | Matsunaga | 345/56 |
| 6,547,227 B1 * | 4/2003 | Mende | 267/168 |
| 6,581,005 B1 * | 6/2003 | Watanabe et al. | 701/210 |
| 6,641,893 B1 * | 11/2003 | Suresh et al. | 428/105 |
| 6,674,434 B1 * | 1/2004 | Chojnacki et al. | 345/428 |
| 6,676,873 B1 * | 1/2004 | Anderson | 264/220 |
| 6,732,046 B1 * | 5/2004 | Joshi | 701/208 |
| 6,823,241 B1 * | 11/2004 | Shirato et al. | 701/1 |
| 6,850,628 B1 * | 2/2005 | Shirato | 382/104 |
| 2002/0010569 A1 * | 1/2002 | Yamamoto | 703/6 |
| 2002/0109679 A1 * | 8/2002 | Masunaga | 345/212 |
| 2002/0169546 A1 * | 11/2002 | Nagel | 701/208 |
| 2003/0101036 A1 * | 5/2003 | Nagel | 703/13 |
| 2003/0204385 A1 * | 10/2003 | Klauder, Jr. | 703/2 |
| 2004/0049339 A1 * | 3/2004 | Kober et al. | 701/209 |
| 2004/0126191 A1 * | 7/2004 | Shreider et al. | 405/180 |
| 2005/0027402 A1 * | 2/2005 | Koibuchi et al. | 701/1 |
| 2005/0041746 A1 * | 2/2005 | Rosen et al. | 375/242 |
| 2005/0055149 A1 * | 3/2005 | Kato et al. | 701/80 |
| 2005/0057374 A1 * | 3/2005 | Tanaka et al. | 340/932.2 |
| 2005/0187705 A1 * | 8/2005 | Niwa et al. | 701/208 |

OTHER PUBLICATIONS

D. S. Meek et al., The use of Cornu spirals in drawing planar curves of controlled curvature, Journal of Computational and Applied Mathematics, vol. 25, Issue 1, Jan. 1989, pp. 69-78.*

Thomas Michael Hessburg, Thesis "Fuzzy logic control with adaptive methods for vehicle lateral guidance", University of California, Berkeley, 1994, 212 pages, AAT 9529344.*

Shahab Eddin Sheikholeslam, Thesis "Control of a class of interconnected nonlinear dynamical systems: The platoon problem", University of California, Berkeley, 1991, 148 pages, ATT 9228852.*

Zhenyan Shen, Thesis "A model for analysis of log truck performance using a two-pass simulation procedure and travel path described by cubic splines", University of Washington, 1993, 127 pages, AAT 9326396.*

Emile Horak, Thesis "The use of survace deflection basin measurements in the mechanistic analysis of flexible pavements", University of Pretoria, 1998, AAT 0564441.*

* cited by examiner

METHOD FOR CALCULATING PARAMETERS IN ROAD DESIGN OF S-TYPE CLOTHOID, COMPLEX CLOTHOID AND EGG TYPE CLOTHOID

BACKGROUND OF THE INVENTION

1. Field of the Invention

The present invention relates to a method for calculating parameters in a road design of a S type, a complex type and an egg type clothoid, and in particular to a method for calculating a parameter value capable of determining the size of a clothoid that is inserted when designing a S-shaped and interchange, a connection road, etc. in an egg shape.

2. Description of the Background Art

Generally, when a vehicle parks at a road directly connecting a straight line and a circle, the vehicle receives a sharp centrifugal acceleration or a rotational angular speed when the radius of a circle is small, so that passenger feels uncomfortable or there is something dangerous in driving. Therefore, a smooth curve may be inserted between the connections for thereby decreasing the above problems. The used in the present invention are defined as follows.

"Clothoid" represents a curve of which a curvature (reverse number of radius) is increased in proportion to the length of a curve and a driving trace that a vehicle makes when the vehicle runs at a constant speed, and the rotation angular speed of the front wheels is constant.

The following equations are obtained at all points on one clothoid.

(curvature radius R at a certain point)×(curve length L from the center of the clothoid to the point)=(constant value $A^2$). The above equation (namely, $R \times L = A^2$ is called the basic formula of the clothoid. All elements of the clothoid are induced based on the above basic formula.

Here, the clothoid may be classified into a basic type (a connection in a sequence of straight line, clothoid, circular curve, clothoid, and straight line), a S shape (two clothoid are inserted between reflection curves), an egg type (clothoid is inserted between double center curves), a protrusion type (two clothoid bent in the same direction are connected with each other), and a complex type (at least two clothoid bent in the same direction). The basic type has been basically used during the design. The basic type design can be easily achieved using the clothoid formulas). The complex type has not used yet. The interchange and connection road are designed in the egg type. The calculation methods of the S type, complex type and egg type are difficult. It is impossible to easily calculate with only the basis formula.

In the S type and egg type, the important thing is to calculate the value of the parameter A determining the size of the clothoid inserted. It is impossible to easily calculate with only the basic formula of the clothoid differently from the basic type.

The egg type has been generally used for the interchange or the connection road. The interchanges are actually used in a combination of one or at least two egg types. The egg type has been generally used in the interchanges of a straight connection type, clover type and trumpet type. Each type can be combined in the independent egg type. The forward direction egg type is an egg type that the linearity is formed in the directions of the entrance and exist axis crossing points. FIG. 1 is a view illustrating the type of a forward direction egg type.

The backward direction egg type is a type that the linearity is formed in the direction of the entrance and exist axis crossing points. FIG. 2 is a view of the backward direction egg type.

The S shape egg type is an egg type that a smoothing curve is installed between the short curves bent in the opposite direction. FIG. 3 is a view of the egg type.

The S type clothoid is the type that the clothoid curve is installed so that the viewing times are same with respect to two circles positioned in the direction opposite to the common axis. Here, the parameter represents the value A of the parameter of the clothoid curve.

The double egg type is the type that the connection is made using two egg types based on the assistant circle in the case that two circles are crossed or are distanced. The double egg type can be classified into four types as shown in FIG. 4. Namely, there are (i) the type that uses the assistant circle including two crossing circles, (ii) the type that uses the assistant circle having two distanced circles, (iii) the type that uses the assistant circle included in two crossing circles and (iv) the type that uses the assistant circle used because the distance in the radiuses of two circles is too large.

The conventional design method of the S type and egg type roads will be described.

[Conventional Design Method of S Shape Clothoid]

When the S shape clothoid curve is designed, the smoothing curve is installed with respect to the common axis so that a straight line does not exist between the smoothing curves of two circles. The parameter values A with respect to the circles 1 and 2 are generally set with the same values, but may be different in some special cases based on the design characteristic. However, there is not any formula for accurately calculating the parameters with respect to the S type clothoid. Therefore, the S type clothoid can be not designed at one time, so that it is separately designed by classifying the circles 1 and 2. Namely, the circle 1 is designed with a symmetric type or a non-symmetric type. The design specification with respect to the circle 2 is designed so that a straight line is not formed between the circles 1 and 2 using a result of the design of the circle 1. However, in the conventional method, it is impossible to set the accurate specification, and it takes long time. Many tests should be performed until a desired result is obtained.

[Conventional Method of Egg Type Design]

The important thing of the egg type design is to determine the parameter A with respect to the smoothing curve installed between a larger circle and a smaller circle. However, there is not currently any formula for accurately calculating the parameter value A. In addition, it is impossible to accurately design and calculate each program. In the currently available programs, the design is performed at one time in the case that a designer designates the parameter value A like the radius of the circle. However, it is actually impossible to calculate the parameter value A for a desired design. Therefore, a proper value is designated and designed. The above process is repeated until a desired design is achieved.

Generally, the value A is not integer and should be calculated down to four~six decimal places in order to use an accurate value in a permissible value in the actual work. Therefore, much efforts should be provided in order to determine the value within a permissible error in the actual work. Since the egg type is mainly used in the interchange or the connection road, the coordinates of the entrance and exist axis at which the egg type is installed has been already determined. Therefore, the start point of the egg type should be provided at the axis of the entrance as a result of the egg type design when designing the egg type, and the ending point should be provided on the axis of the exist, so that the linearities of the front and rear sides of the egg type are not changed. The egg type is not designed at a desired position unless the parameter value A of the egg type is designated with an accurate value within the permissible error. The linearity portions after the egg type get changed as compared to the set linearity.

The egg type generally uses a single egg type. In a special case based on the design characteristic, the double egg type may be used. In the double egg type, there is not any accurate design method.

As the prior art related to the present invention, there is an applied measurement (written by Hong Hyun Ki and published by Seoul Industrial University and published n Feb. 26, 1993) in which the basic formulas and assistant materials for design with respect to the S shape clothoid, egg type clothoid and complex type clothoid design calculations are disclosed. The above theories are obtained based on the books of DIE KLOTOIDE als TRANSSIERUNGSELE-MENT published in 1964 in Germany and STRASENPLA-NUNG mit KLOTOIDEN written by Horst Osterloh and published in 1965.

The value A in the egg type can be obtained using the diagram of Horst Osterloh and the table made by Kasper, Schuerba and Lorenz. The diagram of Osterlok can not be actually used in the actual work, and the table made by Kasper, Schuerba, Lorenz can be actually used in the actual work and can be applied in the programs. In this case, the table is used, so that the size of the program is increased, and the values of the tables are informal values, and multiple tables should be used. The values are obtained by approximate values. In the case that the values are out of a certain range, there may be a big difference from the actual value.

SUMMARY OF THE INVENTION

Accordingly, it is an object of the present invention to overcome the problems encountered in the conventional art.

It is another object of the present invention to provide a method for calculating a parameter value adapted to determine the size of a clothoid when the egg type design is performed in the S shape, complex type, interchange and connection road based on the design condition of the roads. To achieve the above object, there is provided a method for calculating a clothoid parameter value A of the S type and egg type based on a mathematical method through a geometrical interpretation method. Namely, the formula for calculating the parameter value A of the S type and egg type and inducing process of the formula will be described.

It is further another object of the present invention to provide a method for calculating the roads of S type, complex type and egg type in such a manner that a specification needed for the design is automatically calculated without CD as compared to the conventional art in which necessary specifications needed for the design are all designated, and each element is continuously drawn based on a result of the designation.

It is still further another object of the present invention to provide a method for calculating a clothoid parameter in a road design of S type, complex type and egg type that can be simulated in various methods for selecting the coordinate of the center point for the optimum design.

To achieve the above objects, in a method for calculating a S shape clothoid parameter including a unknown clothoid parameter A adapted to radiuses $(R_1 R_2)$ of two circles, the shortest distance between circumferential portions of two circles and two circles, there is provided a method for calculating a S shape clothoid parameter, comprising a step in which an initial value of a tangential angle $\tau_1$, is set; a step in which the value of $(R_1+D+R_2)^2 - Xm^2$ is calculated in such a manner that the tangential angle $(\tau_1)$ is compared, and when a result of the comparison is below 0°, since it means there is not any resolution, the process is stopped, and when a result of the same is over 0°, the process is continued; a step in which the value of $(R_1+D+R_2)2 - Xm^2$ is compared with 0, and when a result of the comparison is below 0, the tangential angle is properly adjusted, and the routine goes back to the step for setting the initial value of the tangential value of $(\tau_1)$, and when a result of the same is over 0, a different fixed rate formula is set up with respect to two circles, and one formula is formed by adding the left and right items in two formulas, for thereby obtaining a tangential angle $(\tau_1)$; a step in which the function F $(\tau_1)$ of the tangential angle $(\tau_1)$ and the function are differentiated with the tangential angle $(\tau_1)$ for thereby calculating the differential function $F'(\tau_1)$; a step in which the ratio $[G=(F(\tau_1)/F'(\tau_1)]$ of two functions of $[(F(\tau_1), F'(\tau_1)]$ are calculated; and a step in which the absolute value of the ratio(G) is compared with a permissible error ($10^{-6}$), and as a result of the comparison when it is over the permissible error, the initial value of the tangential value $(\tau_1)$ is set, and the routine is fed back to the next step of the step that the initial value is set, and when it is below the permissible error, the tangential angle $(\tau_1)$ is determined, and the parameter value A is calculated using the tangential angle $(\tau_1)$.

In the step for calculating the tangential angle with respect to the radius of the circle, the smoothing curve length is obtained in stead of obtaining the tangential angle with respect to the radius of the circle for the reasons that it is $A^2 = R*L = 2\tau R^2$, so that the case for calculating the tangential angle $(\tau)$ and the case for obtaining the smoothing curve length (L) are same variables for obtaining the parameters.

To achieve the above objects, in a method for calculating a S shape clothoid parameter including a unknown clothoid parameter A adapted to radius $(R_1 R_2)$ of two circles, the shortest distance between circumferential portions of two circles and two circles, there is provided a method for calculating an egg type clothoid parameter, comprising a step in which an initial value of a tangential angle $T_1$ is set; a step in which the value of $(R_1-R_2-D)^2 - Xm^2$ is calculated in such a manner that the tangential angle $(\tau_1)$ is compared, and when a result of the comparison is below 0°, since it means there is not any resolution, the process is stopped, and when a result of the same is over 0°, the process is continued; a step in which the value of $(R_1-R_2-D)^2 - Xm^2$ is compared with 0, and when a result of the comparison is below 0, the tangential angle is properly adjusted, and the routine goes back to the step for setting the initial value of the tangential value of $(\tau_1)$, and when a result of the same is over 0, a different fixed rate formula is set up with respect to two circles, and one formula is formed by adding the left and right items in two formulas, for thereby calculating $F'(\tau_1)$ by differentiating the function $F(\tau_1)$ of the tangential angle$(\tau_1)$ and the function with the tangential angle $(\tau_1)$; a step in which the ratio of $[G=(F(\tau_1)/F'(\tau_1)]$ of two functions of $[(F(\tau_1), F'(\tau_1)]$ is calculated; a step in which the tangential angle of $\tau_1=\tau_1-G$ is calculated; and a step in which the absolute value of the ratio(G) is compared with a permissible error ($10^{-6}$), and as a result of the comparison when it is over the permissible error, the initial value of the tangential value $(\tau_1)$ is set, and the routine is fed back to the next step of the step that the initial value is set, and when it is below the permissible error, the tangential angle ($\tau_1$) is determined, and the parameter value A is calculated using the tangential angle ($\tau_1$).

In addition, the clothoid parameter is calculated with respect to the multiple egg type (egg type of more than double egg type) using the egg type road clothoid parameter calculation method. The double egg type is recognized as an independent egg type, and the egg type clothoid parameter value is calculated with respect to each independent egg type.

The double egg type road designing method can be selected from the group comprising a method that designs using an assistant circle including two crossing circles; a method that designs using an assistant circle including two distanced circles; a method that designs using an assistant circle included in the two crossing circles; and a method that designs using an assistant circle including a smaller circle and included in a larger circle.

Here, the egg type is the type in which there is one egg type clothoid in two circles. In this case, the smaller circle should be included within the larger circle. In a special case, the double egg type can be installed using three circles. In this case, there are two egg type clothoid. The above construction can be directly adapted to the double egg type. Namely, the formula for calculating the parameter A with respect to the egg type clothoid can be directly adapted when calculating the parameter A with respect to the double egg type or the triple egg type.

Here, the double egg type is the type in which two egg types are continuously arranged. When designing the double egg type, it is needed to independently design two continuous egg types. Therefore, when the calculation is performed using the design method of the egg type, the double egg type design can be achieved. The above method can be adapted to the multiple egg type of over double egg types.

The complex type clothoid is very similar with the egg type except for the differences that the circular portion with respect to the larger circle exists in the egg type, but does not exist in the complex type. (The length of the circle and the center angle of the circle are all 0). The method for calculating the parameter A of the complex clothoid is same as the method for calculating the parameter A in the egg type clothoid. When the parameter A is obtained, it is possible to easily design the complex type clothoid. The design itself of the complex type clothoid can directly adapt the method of the egg type design. However, it is needed to process the center angle of the circle with respect to the larger circle to 0. Therefore, since the method for calculating the parameter A of the egg type clothoid in the present invention can be directly adapted to the method of calculating the parameter A in the complex type clothoid.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 5:
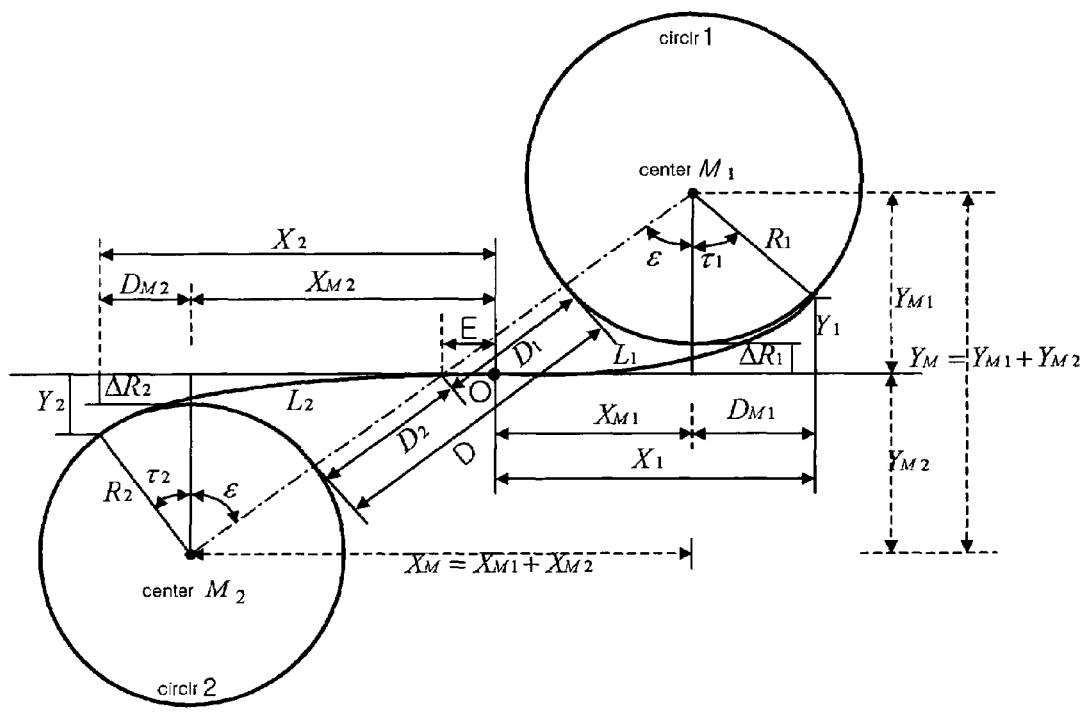
FIG. 5 is a view illustrating a S type clothoid according to the present invention.
Figure 6:
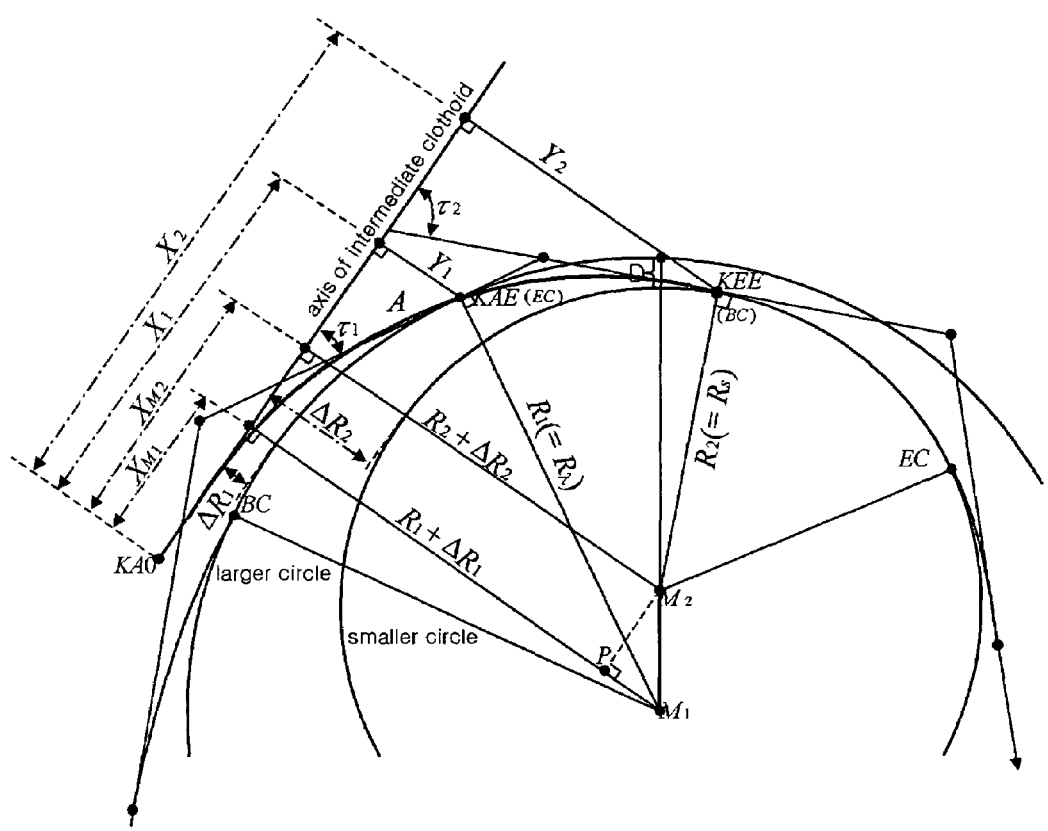
FIG. 6 is a view illustrating a egg type clothoid according to the present invention.
Figure 7:
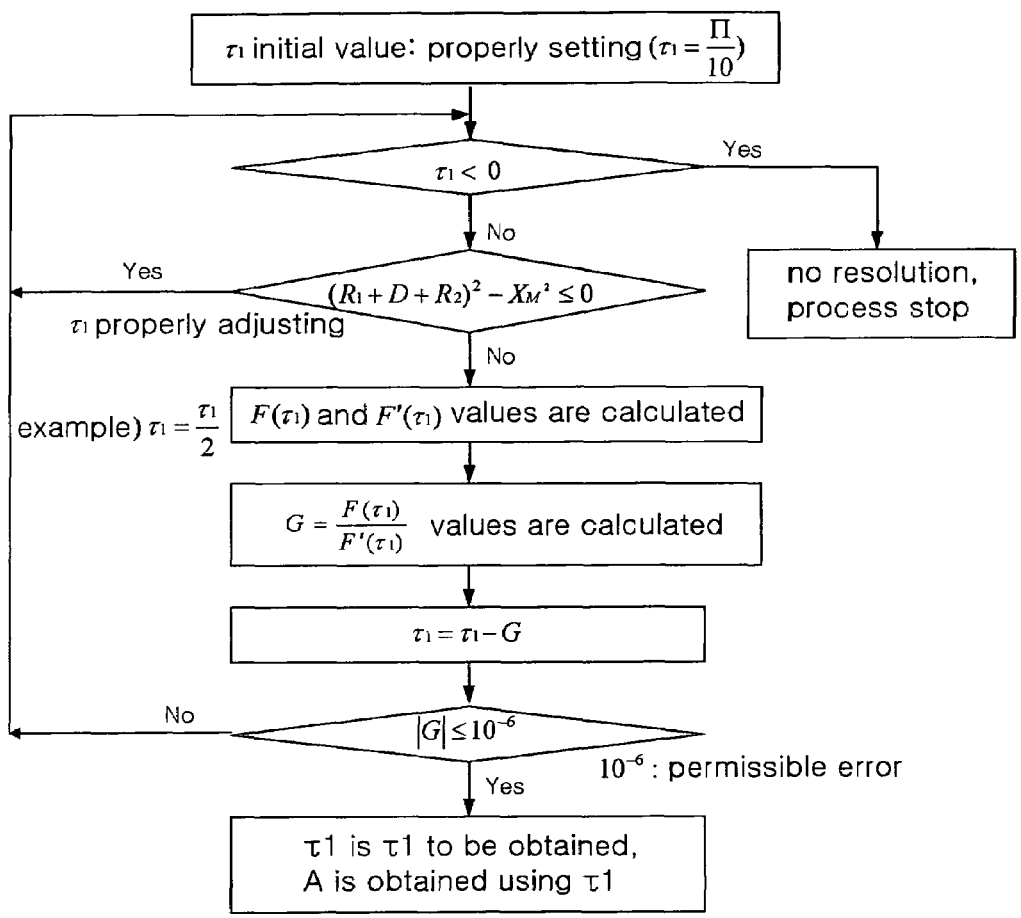
FIG. 7 is a flow chart illustrating a S type clothoid parameter calculation method according to the preset invention.
Figure 8:
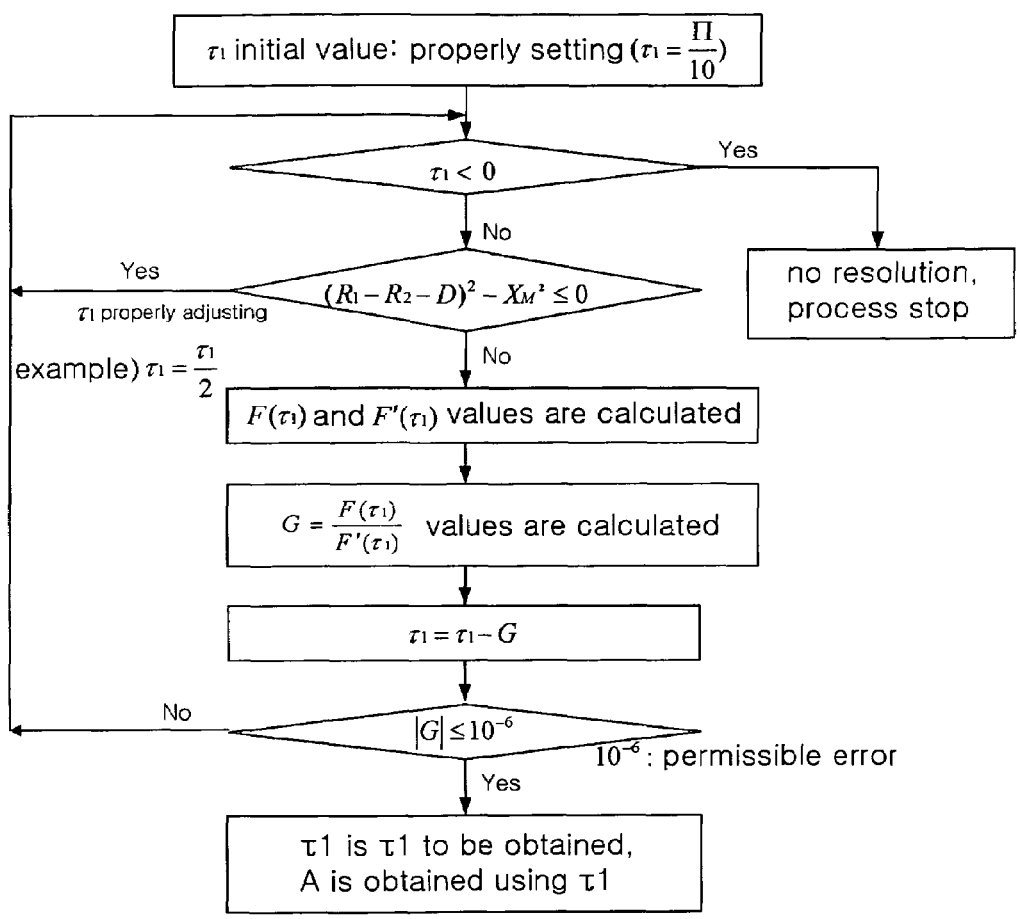
FIG. 8 is a flow chart illustrating an egg type clothoid parameter calculation method according to the present invention.

FIG. 5 is a view illustrating a S type clothoid according to the present invention, FIG. 6 is a view illustrating a egg type clothoid according to the present invention, FIG. 7 is a flow chart illustrating a S type clothoid parameter calculation method according to the preset invention, and FIG. 8 is a flow chart illustrating an egg type clothoid parameter calculation method according to the present invention.

Figure 9:
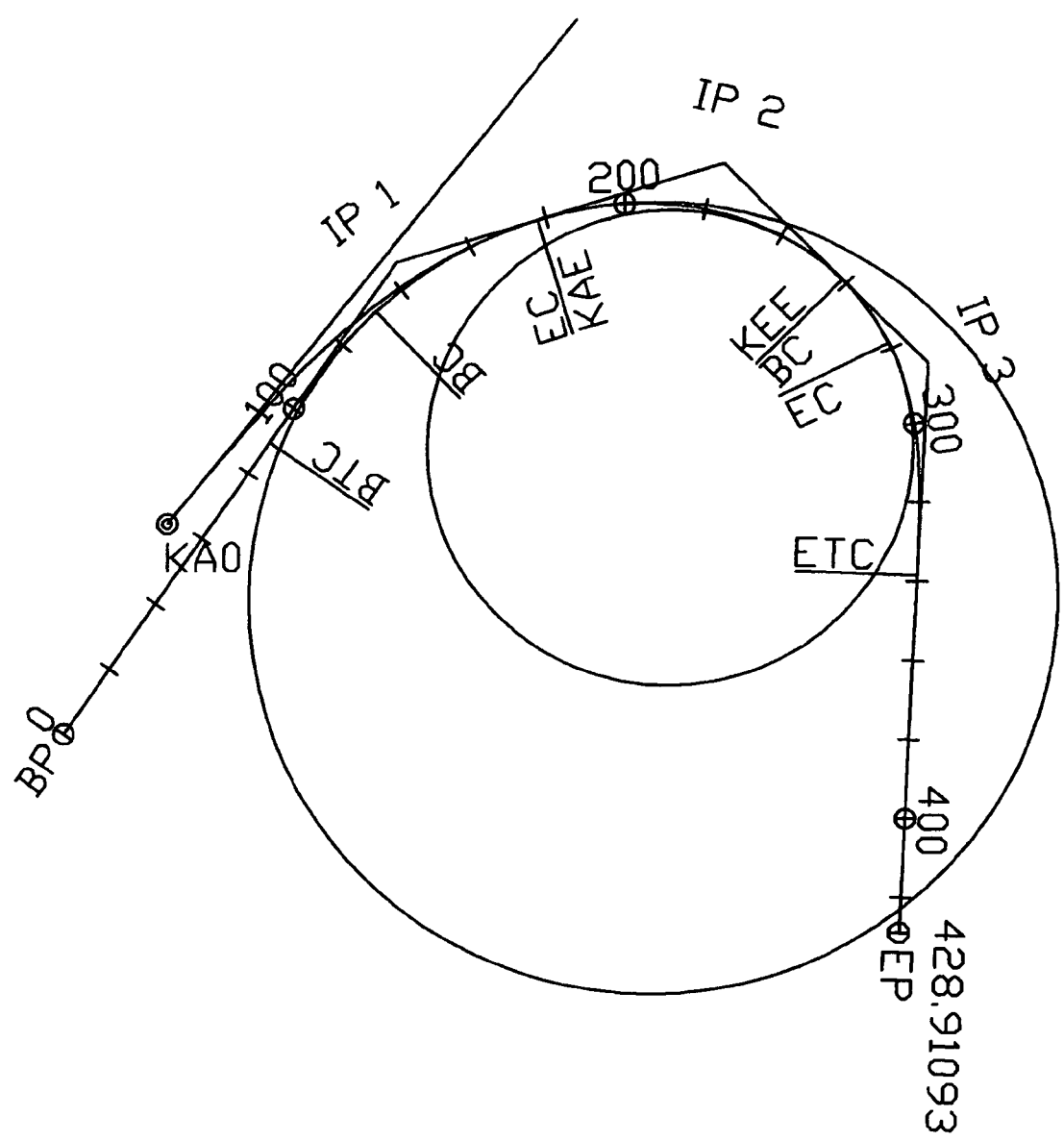
FIG. 9 is a view illustrating a forward direction egg type design according to the present invention.
Figure 10:
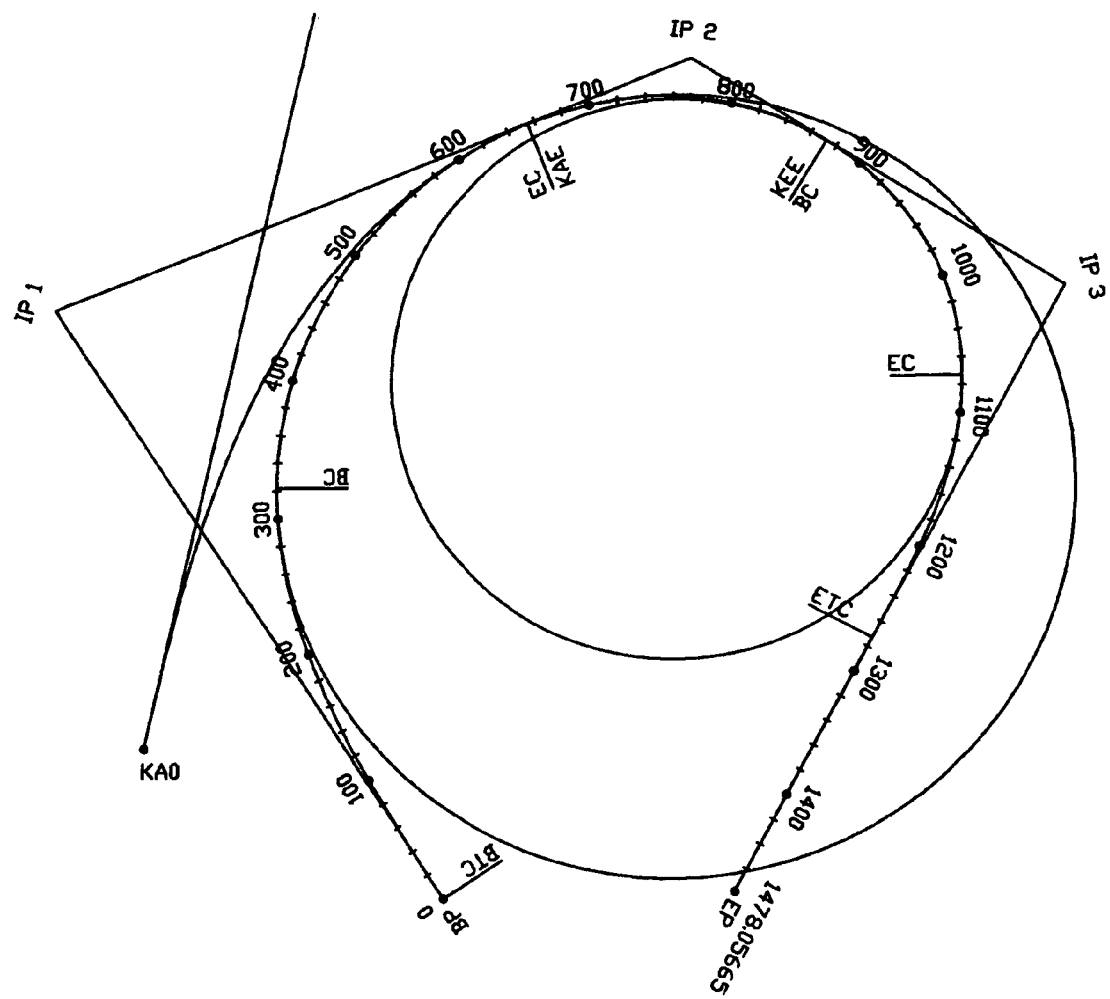
FIG. 10 is a view illustrating a backward direction egg type design according to the present invention.
Figure 11:
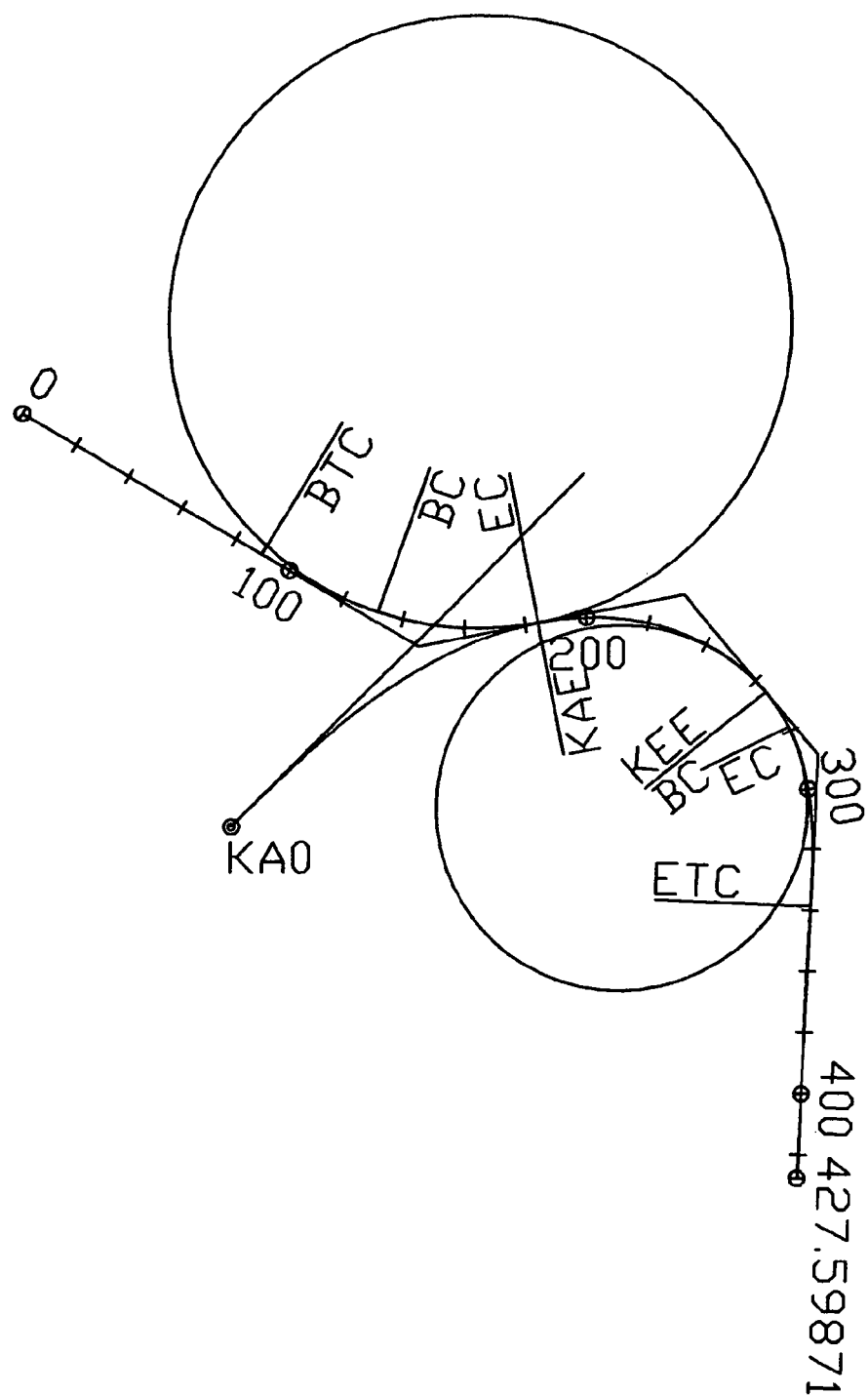
FIG. 11 is a view illustrating a S-shaped egg type design according to the present invention.

FIG. 9 is a view illustrating a forward direction egg type design according to the present invention, FIG. 10 is a view illustrating a backward direction egg type design according to the present invention, and FIG. 11 is a view illustrating a S-shaped egg type design according to the present invention.

Figure 12:
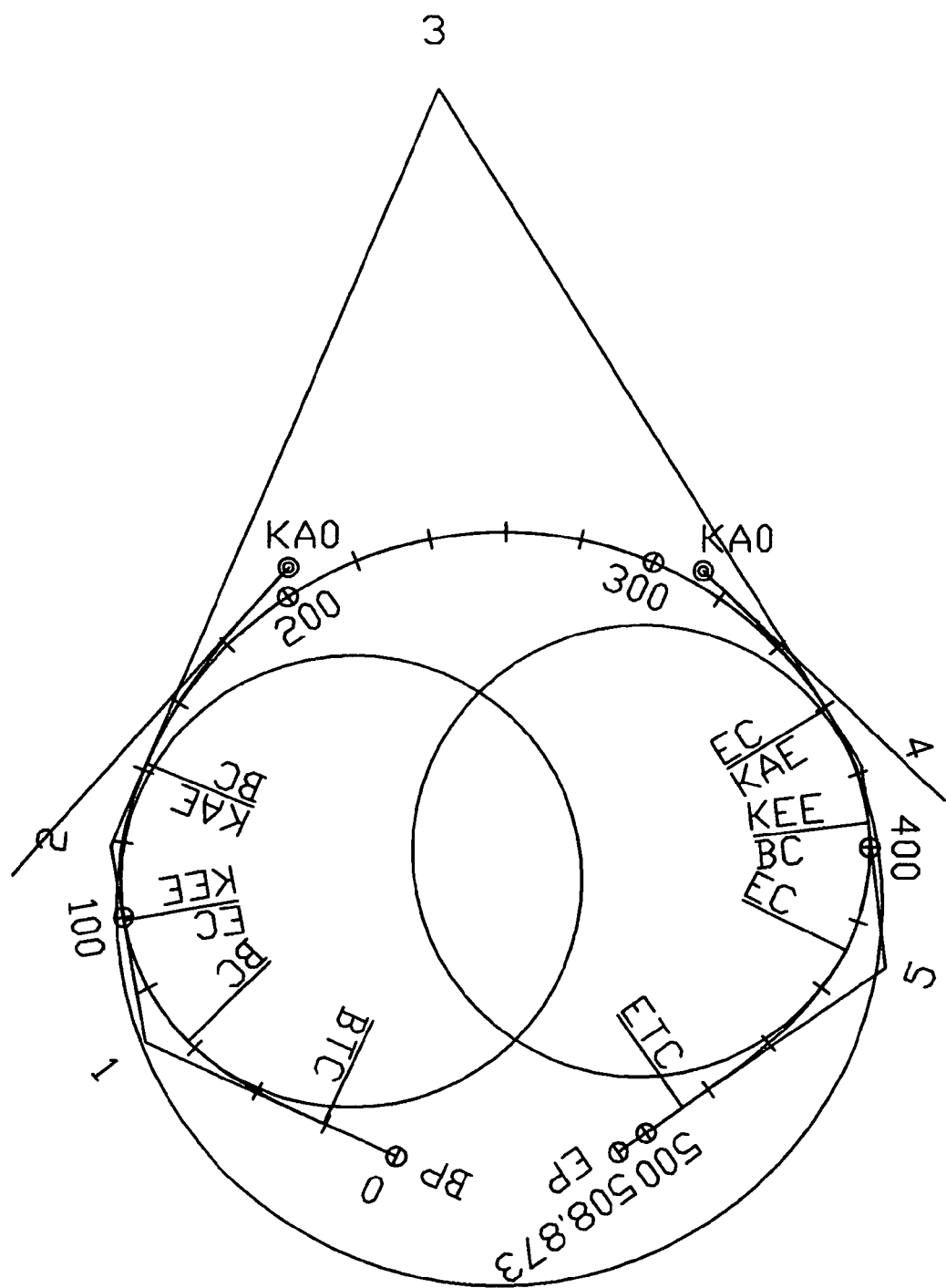
FIG. 12 is a view illustrating a double egg type using an assistant circle having two crossing circles according to the present invention.
Figure 13:
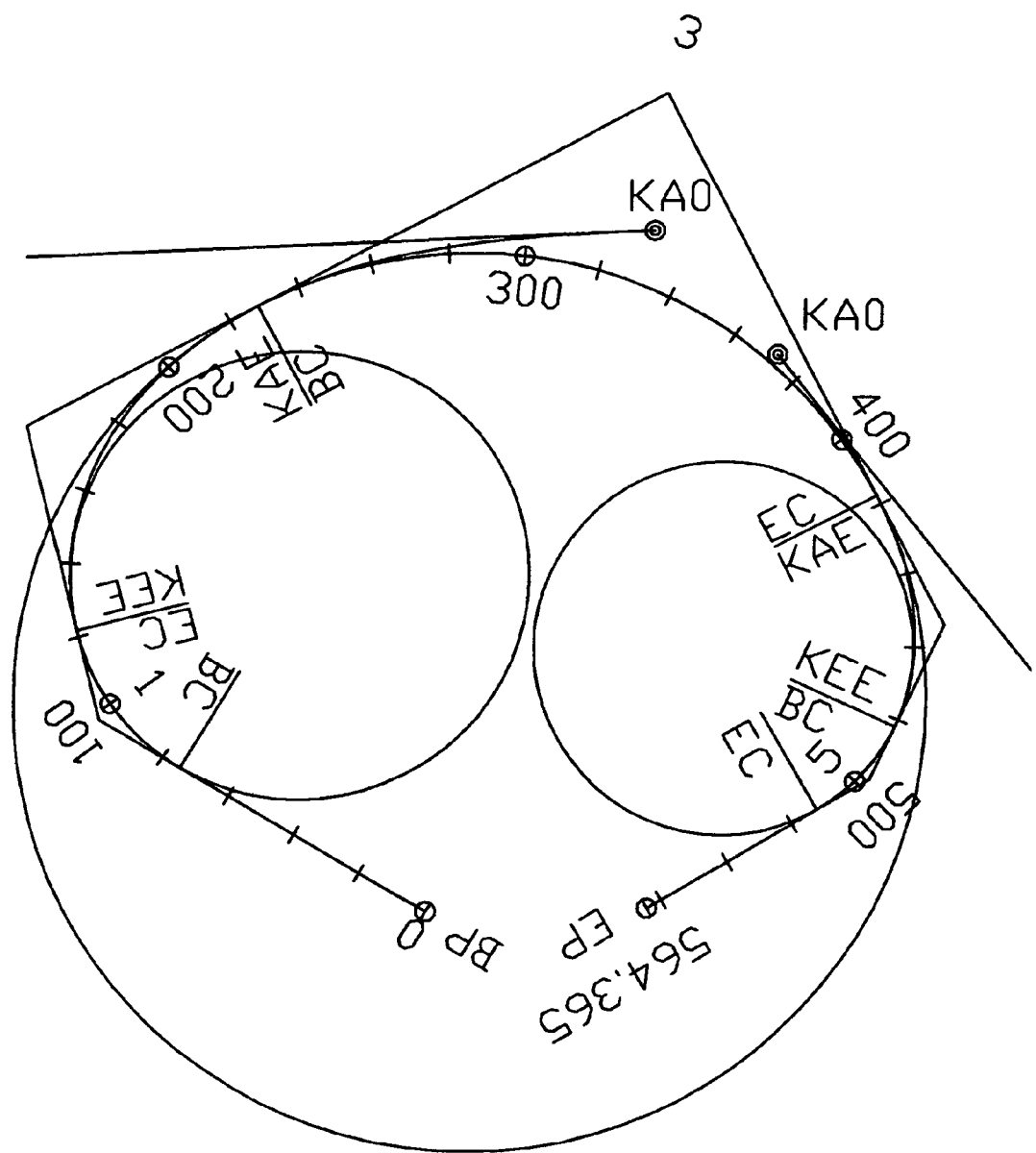
FIG. 13 is a view illustrating a double egg type using an assistant circle having two distanced circles according to the present invention.
Figure 14:
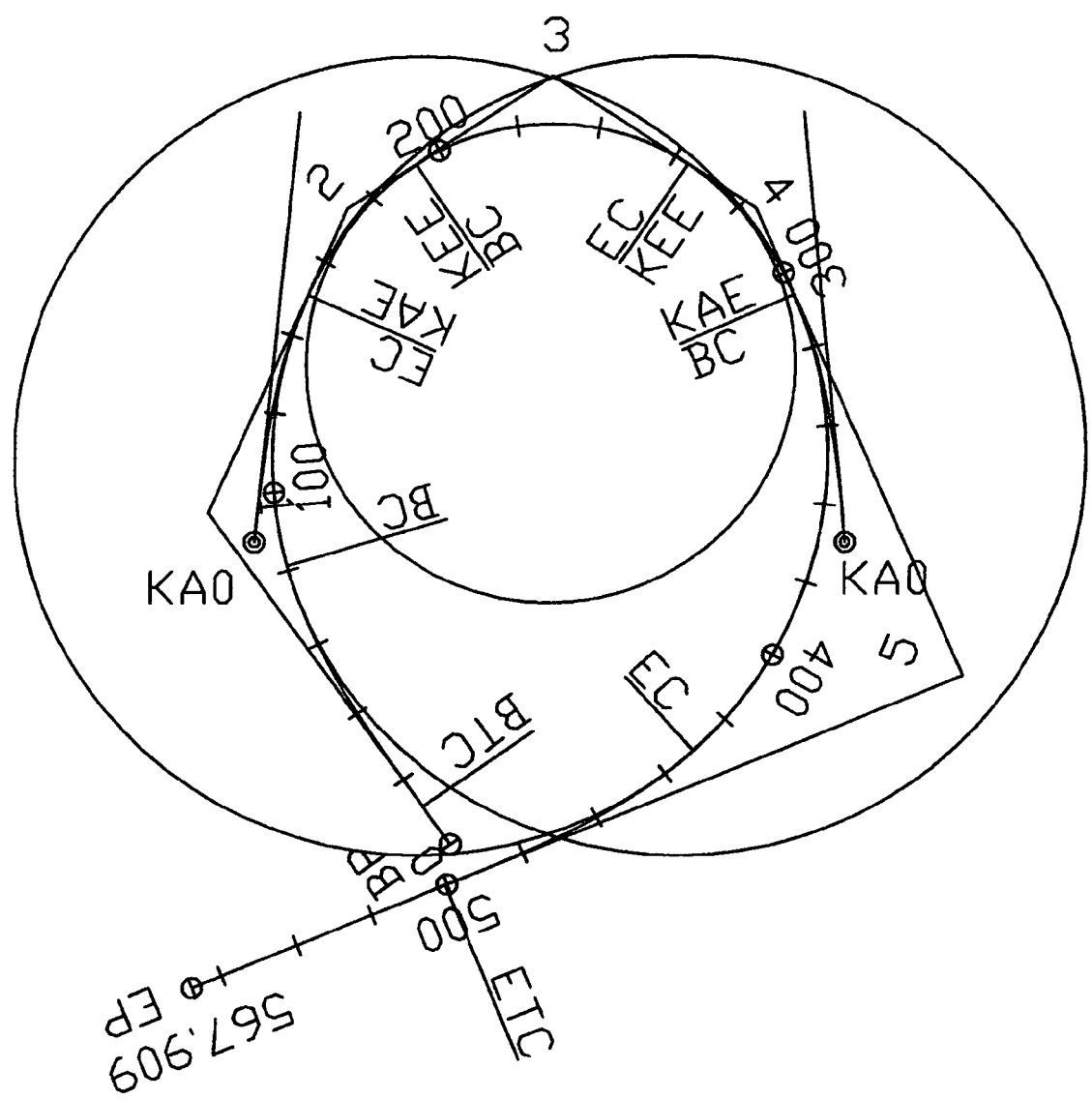
FIG. 14 is a view illustrating a double egg type using an assistant circuit having two crossing circles according to the present invention.
Figure 15:
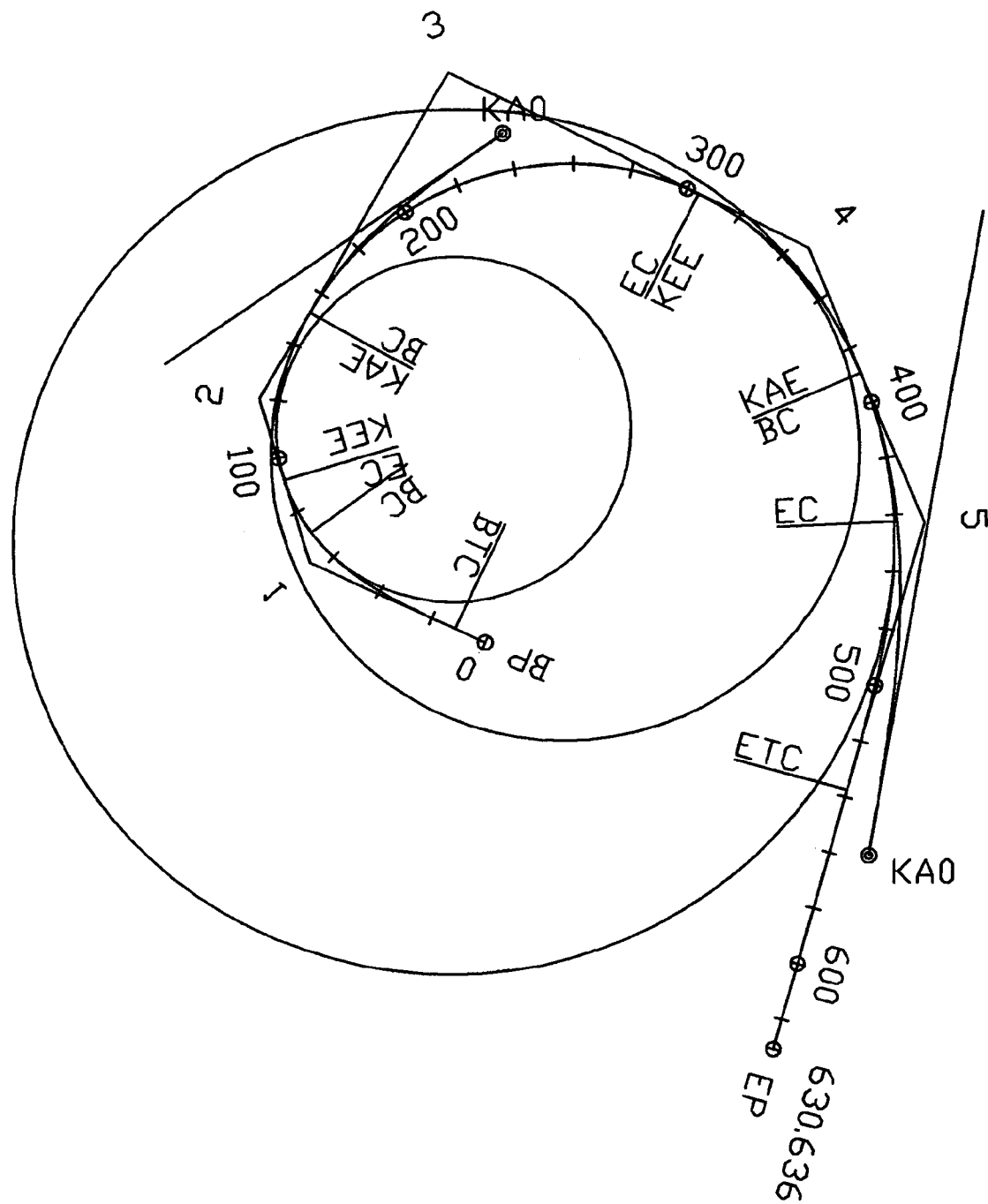
FIG. 15 is a view illustrating a double egg type using an assistant circle because a distance between the distances in the radiuses of two circles according to the present invention.
Figure 16:
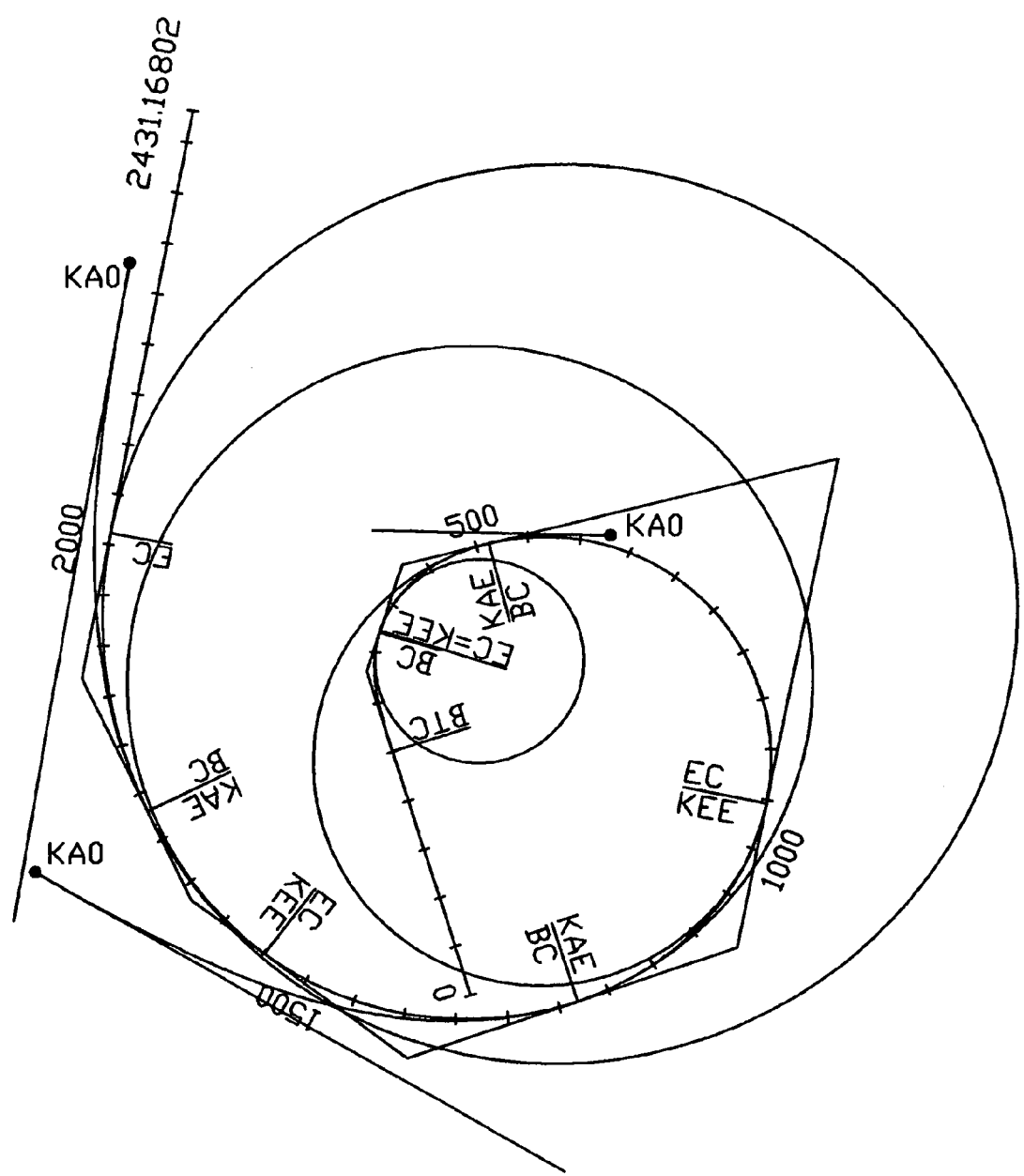
FIG. 16 is a view illustrating a design example of a triple egg type according to the present invention.

FIG. 12 is a view illustrating a double egg type using an assistant circle having two crossing circles according to the present invention, FIG. 13 is a view illustrating a double egg type using an assistant circle having two distanced circles according to the present invention, FIG. 14 is a view illustrating a double egg type using an assistant circuit having two crossing circles according to the present invention, FIG. 15 is a view illustrating a double egg type using an assistant circle because a distance between the distances in the radiuses of two circles according to the present invention, and FIG. 16 is a view illustrating a design example of a triple egg type according to the present invention;

First Embodiment

Calculation Method of $A_1$, $A_2$ at S Type Clothoid

1. Characteristic of S Type Clothoid

As shown in FIG. 5, in the S type clothoid, two circles having radius of $R_1$, $R_2$ positioned at the opposite portion with respect to the common tangential line are connected with the smoothing line with respect to the common tangential line as an axis based on $A_1, A_2$. At this time, the values $A_1, A_2$ have the same values or different values. Generally, the values $A_1, A_2$ have the same values. In the S type clothoid design, it is most difficult to determine the values $A_1, A_2$. When the values $A_1, A_2$ installed at the common tangential line are determined, it is very easy to install the S type clothoid. In particular, it is most important to know the coordinate of the point 0 that is the intermediate points of the center points M1 and M2 of two circles. Namely, two clothoid points are set same for thereby determining the positions of the same, so that the parameter values A are determined in the S type clothoid. As shown in FIG. 5, in the S type clothoid, the formulas for calculating the values $A_1, A_2$ and the inducing process of the formula will be described.

2. Basic Concept of Calculations of $A_1, A_2$

1) Necessary specification

The following four values are needed for calculating the parameter values $A_1, A_2$ of the S type clothoid using the radius $R_1$, $R_2$ of two circles.

(1) Radius $R_1$ of the first circle
(2) Radius $R_2$ of the second circle
(3) Distance D between circumferential portions of two circles on the straight line connecting the center points of two circles
(4) Value K of the ratio of unknown values $A_1, A_2$:

$$K = \frac{A_2}{A_1}$$

At this time, in the values $R_1$, $R_2$, it is not needed that the value $R_1$ should be larger, and the value $R_2$ could be larger than the value $R_1$. The value $A_1$ should be the value $A_2$ with respect to $R_1$.

Here, the subscripts 1 and 2 represent the values with respect to the values $R_1$, $R_2$, not the larger or smaller value. Namely, it does not matter with the size of the radius. The actual values of $A_1, A_2$ are calculated based on the value A. Namely, when the value K=1, $A_1=A_2$, and K is not 1, $A_1$ is not $A_2$. When K=0, $A_1$ is larger than 0, and the value $A_2$ is 0.

2) Approaching Method of Formula Induction

The calculation formula of $A_1, A_2$ is induced from the different fixed rate calculation formula in the clothoid formula.

Namely, since $\Delta R = Y + R \cos \tau - R$, $Y + \cos \tau - R - \Delta R = 0$.

Therefore, the different fixed rate formula for each $R_1$, $R_2$ is as follow.

$Y_1 + R_1 \cos \tau_1 - R_1 = 0$      formula 1

$Y_2 + R_2 \cos \tau_2 - R_2 - \tau R_2 = 0$      formula 2

The formulas 1 and 2 are added, and a result of the same is assumed as a function F.

$F = Y_1 + Y_2 + R_1 \cos \tau_1 + R_2 \cos \tau_2 - (R_1 + \Delta R_1 + R_2 + \Delta R_2)$      formula 3

The different fixed rate formula of $\Delta R = Y + R \cos \tau - R$ may be expressed as a radius, a smoothing curve length (R, L) or a radius, tangential angle (R, $\tau$), so that the function can be expressed as $R_1$, $R_2$, $L_1$, $L_2$ and $R_1$, $R_2$, $\tau_1$, $\tau_2$. However, the value $R_1$, $R_2$ is the given values, namely, the constant values, so that the function F can be expressed as a function of $L_1, L_2$ or $\tau_1, \tau_2$.

In the relationship of $L_1$, $L_2$ or $\tau_1, \tau_2$, in the clothoid formula, $A^2 = RL$, and in $$K = \frac{A_2}{A_1}, K = \frac{\sqrt{R_2 L_2}}{\sqrt{R_1 L_1}}.$$

Since $L_2$ can be expressed in the formula of $L_1$, the value of $L_2$ is the function with respect to $L_1$.

In the same manner, in the clothoid formula, $A = \sqrt{2\tau R}$ in the $$K = \frac{A_2}{A_1}, K = \frac{\sqrt{2\tau_2} R_2}{\sqrt{2\tau_1} R_1},$$

so that $$\tau_2 = \left(K \frac{R_1}{R_2}\right)^2 \tau_1.$$

Assuming that $$t = \left(K \frac{R_1}{R_2}\right)^2,$$      formula 4 the formula (5) of $\tau_2 = t\tau_1$ is obtained.

$\tau_2$ can be expressed in the formula of $\tau_1$, so that the value of $\tau_2$ is the function with respect to $\tau_1$.

Therefore, the function F of the formula 3 can be expressed in $L_1$, or $\tau_1$ and in the function of $F(L_1)$ or $F(\tau_1)$. In the present invention, the function F of the formula 3 will be expressed in the formula of $F(\tau_1)$. Therefore, the formula 3 can be expressed in the function of the tangential angle of $\tau_1$ with respect to the radius of $R_1$.

$F(\tau_1) = Y_1 + Y_2 + R_1 \cos \tau_1 + R_2 \cos \tau_2 - (R_1 + \Delta R_1 + R_2 + \Delta R_2)$      formula 6

It is impossible to obtain the solution of the function $F(\tau_1)$ with only the formula 6. However, it can be obtained using the non-lineal equation. Therefore, the function $F(\tau_1)$ is differentiated with respect to $r_1$, namely, the function $F'(\tau_1)$ is obtained based on $$F'(\tau_1) = \frac{d}{d\tau_1} F(\tau_1),$$

and when dissolving the functions of $F(\tau_1)$ and $F'(\tau_1)$ with the non-lineal equation, it is possible to obtain the value $\tau_1$. When the value of $\tau_1$ is obtained, in the clothoid formula, the value A1 can be easily obtained, and the value A2 can be obtained based on $$K = \frac{A_2}{A_1}.$$

3) Reference Matters

The function F in the formula 6 is expressed in the function of $\tau_1$. It does not need to calculate in the function of $\tau_1$. When it is calculated with the functions of $F(L_1)$ and $F'(L_1)$ with respect to $L_1$, the same result is obtained.

In addition, when the values of $L_2$ or $\tau_2$ is obtained using $F(L_2), F'(L_2)$ or $F(\tau_2), F'(\tau_2)$, and then the value of $A_1, A_2$ is obtained, the same result is obtained.

When obtaining the resolution of the non-linear equation, it is possible to fast calculate the value $\tau_1$ using the $F(\tau_1)$ as compared to calculating the $\tau_1$, using $F(L_1)$ when comparing the tangential angle $\tau_1$ and the smoothing curve length $L_1$ In addition, the values of $A_1, A_2$ are obtained with $\tau_1$ and $L_1$, and the element values of the clothoid with respect to two circles are calculated using the values of $A_1, A_2$, and the value of D is calculated using the coordinates of the center points of two circles. In order to obtain the same value as the value D that is an input specification, the accuracy when the resolution is calculated based on the non-linear equation should be smaller as compared to the function $F(\tau_1)$ in the case of the function $F(L_1)$.

Since $L=2\tau R$ in the clothoid equation, the above operation should be performed for the reasons that the value should be significantly smaller when the function L is used as compared to when the function $\tau$ is used for the same result.

Therefore, in the present invention, since the above reasons and the expression formula of the function are relatively simple, the formula 3 is not used in the equation of $F(L_1)$, and the function $F(\tau_1)$ is used.

3. Development of the Function of $F(\tau_1)$

The items located in the right sides in the equation of $F(\tau_1) = Y_1 + Y_2 + R_1 \cos \tau_1 + R_2 \cos \tau_2 - (R_1 + \Delta R_1 + R_2 + \Delta R_2)$ may be expressed in the constant values of $R_1, R_2, D, K$ and the unknown value of $\tau_1$. Namely, all items located in the right side can be expressed in the function of $\tau_1$.

In the clothoid formula, since $A^2 = 2\tau R^2$, $A = \sqrt{2\tau} R$ and $A\sqrt{2\tau} = 2\tau R$, and since $$X = A\sqrt{2\tau}\left(1 - \frac{\tau^2}{10} + \frac{\tau^4}{216} - \frac{\tau^6}{9360}\right) = 2\tau R\left(1 - \frac{\tau^2}{10} + \frac{\tau^4}{216} - \frac{\tau^6}{9360}\right),$$

$$X = 2R\left(1 - \frac{\tau^3}{10} + \frac{\tau^5}{216} - \frac{\tau^7}{9360}\right).$$

In the equation of $$Y = \frac{\sqrt{2}}{3} A\sqrt{\tau^3}\left(1 - \frac{\tau^2}{14} + \frac{\tau^4}{440} - \frac{\tau^6}{25200}\right),$$

$$Y = \frac{\sqrt{2}}{3} \sqrt{2\tau} \sqrt{\tau^3} R\left(1 - \frac{\tau^2}{14} + \frac{\tau^4}{440} - \frac{\tau^6}{25200}\right),$$

-continued
$$Y = \frac{2}{3} R\left(\tau^2 - \frac{\tau^4}{14} + \frac{\tau^6}{440} - \frac{\tau^8}{25200}\right).$$

and

In the above formula 6, the first item $Y_1$ can be expressed in the function of $\tau_1$, in the clothoid equation.

$$Y_1 = \frac{2}{3} R_1\left(\tau_1^2 - \frac{\tau_1^4}{14} + \frac{\tau_1^6}{440} - \frac{\tau_1^8}{25200}\right) \quad \text{Formula 6a}$$

The second item $Y_2$ can be expressed in the function of $\tau_1$ in the clothoid equation.

In the formula 5, since $r_2 = t\tau_1$, $$Y_2 = \frac{2}{3} R_2\left\{(t\tau_1)^2 - \frac{(t\tau_1)^4}{14} + \frac{(t\tau_1)^6}{440} - \frac{(t\tau_1)^8}{25200}\right\} \quad \text{Formula 6b}$$

The fourth item $R_2 \cos \tau_2$ can be expressed in the function of $\tau_1$ because $\tau_2 = t\tau_1$ in the formula 5.

$$R_2 \cos \tau_2 = R_2 \cos(t\tau_1) \quad \text{Formula 6c}$$

The last fifth item of $(R_1 + \Delta R_1 + R_2 + \Delta R_2)$ can be expressed as follows.

In the clothoid equation, since $X_M = X - R \sin \tau$, the equations of $X_{M1} = X_1 - R \sin \tau_1$ and $X_{M2} = X_2 - R_2 \sin \tau_2$ are obtained.

At this time $$X_1 = 2R_1\left(\tau_1 - \frac{\tau_1^3}{10} + \frac{\tau_1^5}{216} - \frac{\tau_1^7}{9360}\right), \quad \text{Formula 6d}$$

and $$X_2 = 2R_2\left(\tau_2 - \frac{\tau_2^3}{10} + \frac{\tau_2^5}{216} - \frac{\tau_2^7}{9360}\right),$$

and as shown in Formula since $\tau_2 = t\tau_1$, $$X_2 = 2R_2\left\{(t\tau_1) - \frac{(t\tau_1)^3}{10} + \frac{(t\tau_1)^5}{216} - \frac{(t\tau_1)^7}{9360}\right\}. \quad \text{Formula 6e}$$

Assuming that $X_M = X_{M1} + X_{M2}$, the equations are $X_M = X_1 - R_1 \sin \tau_1 + X_2 - R_2 \sin \tau_2$ and $r_2 = t\tau_1$. Therefore, $X_M$ is unknown number, and $\tau_1$, is a function. The above can be expressed as follows.

$$X_M = X_1 - R_1 \sin \tau_1 + X_2 - R_2 \sin(t\tau_1) \quad \text{Formula 6f}$$

In addition, assuming that $Y_{M1} = R_1 + \Delta R_1$, $Y_{M2} = R_2 + \Delta R_2$, $Y_M = Y_{M1} + Y_{M2}$, since the distance between the center points of two circles is $(R_1 + D + R_2)^2 = X_M^2 + Y_M^2$, and $$Y_M = \sqrt{(R_1 + D + R_2)^2 - X_M^2} = Y_{M1} + Y_{M2} = R_1 + \Delta R_1 + R_2 + \Delta_2.$$

$$\therefore R_1 + \Delta R_2 + \Delta R_2 = \sqrt{(R_1 + D + R_2)^2 - X_M^2} \quad \text{Formula 6g}$$

In the right side items of FIG. 6, when the formulas 6a, 6b, 6c and 6g are inputted into the first, second, fourth and fifth items, as shown in the formula 6, the unknown number remains $\tau_1$(Formula 7). The last formulas of the function of $F(\tau_1)$ is as follows.

$$F(\tau_1) = \frac{2}{3}R_1\left(\tau_1^2 - \frac{\tau_1^4}{14} + \frac{\tau_1^6}{440} - \frac{\tau_1^8}{25200}\right) + \quad \text{formula 7}$$

$$\frac{2}{3}R_2\left\{(t\tau_1)^2 - \frac{(t\tau_1)^4}{14} + \frac{(t\tau_1)^6}{440} - \frac{(t\tau_1)^8}{25200}\right\} +$$

$$R_1\cos\tau_1 + R_2\cos(t\tau_1) - \sqrt{(R_1 + D + R_2)^2 - X_M^2}.$$

wherein in the formula 7, $X_M$ is $X_M = X_1 - R_1\sin\tau_1 + X_2 - R_2\sin(t\tau_1)$ based on Formula 6a, and $X_1, X_2$ can be obtained based on formulas 6d and 6e.

Therefore, the function $F(\tau_1)$ may use the formula 7 or the formula 6. In the case that the formula 7 is used, the formula is physically too long. In addition, in the case that the formula 6 is used, the values of the formulas 6a, 6b, 6c and 6e may be inputted.

Here, when computing the function, in $\sqrt{(R_1+D+R_2)^2-X_M^2} \leq 0$, the tangential angle value $\tau_1$ should be adjusted to a proper value, the equations of $$\tau_1 = \frac{\tau_1}{2})$$

$F(\tau_1)$ 와 $F'(\tau_1)$ should be calculated.

4. Development of the Function $F'(\tau_1)$

The function $F(\tau_1)$ is differentiated with respect to the value $\tau_1$, for thereby forming $F'(\tau_1)$, so that $$F'(\tau_1) = \frac{d}{d\tau_1}F(\tau_1)$$

is obtained.

At this time, the function $F(\tau_1)$ should be differentiated using the formula 7, not the formula 6.

$$\therefore F'(\tau_1) = \frac{d}{d\tau_1}\{Y_1 + Y_2 + R_1\cos\tau_1 + R_2\cos\tau_2 - \quad \text{Formula 8}$$

$$\sqrt{(R_1 + D + R_2)^2 - X_M^2}\}$$

Each item at the right side of the formula 8 will be differentiated with respect to the value $\tau_1$.

When differentiating the first item $Y_1$ with respect to $r_1$, In the formula 6a, $$Y_1 = \frac{2}{3}R_1\left(\tau_1^2 - \frac{\tau_1^4}{14} + \frac{\tau_1^6}{440} - \frac{\tau_1^8}{25200}\right), \text{ and} \quad \text{Formula 8a}$$

$$\frac{d}{d\tau_1}(Y_1) = \frac{2}{3}R_1\left(2\tau_1 - \frac{4\tau_1^3}{14} + \frac{6\tau_1^5}{440} - \frac{8\tau_1^7}{25200}\right).$$

When differentiating the second item $Y_2$ with respect to $\tau_1$, In the formula 6b), $$Y_2 = \frac{2}{3}R_2\left\{(t\tau_1)^2 - \frac{(t\tau_1)^4}{14} + \frac{(t\tau_1)^6}{440} - \frac{(t\tau_1)8}{25200}\right\},$$

and $$\frac{d}{d\tau_1}(Y_2) = \frac{2}{3}R_2\left(2t^2\tau_1 - \frac{4t^4\tau_1^3}{14} + \frac{6t^6\tau_1^5}{440} - \frac{8t^8\tau_1^7}{25200}\right). \quad \text{formula 8b}$$

When differentiating the third item $R_2\cos\tau_2$, with respect to $\tau_1$, $$\frac{d}{d\tau_1}(R_1\cos\tau_1) = -R_1\sin\tau_1. \quad \text{formula 8c}$$

When differentiating the fourth item $R_2\cos\tau_2$ with respect to $\tau_1$, we can get $\tau_2 = t\tau_1$ based on the formula 5, and $$\frac{d}{d\tau_1}(R_2\cos\tau_2) = \frac{d}{d\tau_1}\{R_2\cos(t\tau_1)\} = -R_2t\sin(t\tau_1). \quad \text{formula 8d}$$

Now, when differentiating the fifth item $\sqrt{(R_1+D+R_2)^2-X_M^2}$ with respect to $\tau_1$, $$\frac{d}{d\tau_1}\sqrt{(R_1 + D + R_2)^2 - X_M^2} = \quad \text{formula 8e}$$

$$\frac{d}{d\tau_1}\{(R_1 + D + R_2)^2 - X_M^2\}^{\frac{1}{2}}, \text{ and}$$

$$\frac{d}{d\tau_1}\sqrt{(R_1 + D + R_2)^2 - X_M^2} =$$

$$\frac{1}{2}\{(R_1 + D + R_2)^2 - X_M^2\}^{\frac{-1}{2}} * \frac{d}{d\tau_1}(-X_M^2) =$$

$$\frac{1}{2\sqrt{(R_1 + D + R_2)^2 - X_M^2}} * (-2X_M) * \frac{d}{d\tau_1}X_M \therefore$$

$$\frac{d}{d\tau_1}\sqrt{(R_1 + D + R_2)^2 - X_M^2} =$$

$$\frac{-X_M}{\sqrt{(R_1 + D + R_2)^2 - X_M^2}} * \frac{d}{d\tau_1}X_M.$$

In the formula 6f, the value $X_M$ is the function of the unknown value $\tau_1$, $$\frac{-X_M}{\sqrt{(R_1 + D + R_2)^2 - X_M^2}}$$

may be substituted with the constant values of $R_1$, $R_2$, D, K and $\tau_1$, it is the function of $\tau_1$. Therefore, the equation of $$\frac{d}{d\tau_1} X_M$$

may be developed with the function of $\tau_1$.

In the formula 6f, since it is $X_M = X_1 - R_1 \sin \tau_1 + X_2 - R_2 \sin(t\tau_1)$, we can get 
$$\frac{d}{d\tau_1} X_M = \frac{d}{d\tau_1}\{X_1 - R_1 \sin \tau_1 + X_2 - R_2 \sin(t\tau_1)\}. \quad \text{formula 8f}$$

In the formula 6d, since it is $$X_1 = 2R_1 \left( \tau_1 - \frac{\tau_1^3}{10} + \frac{\tau_1^5}{216} - \frac{\tau_1^7}{9360} \right),$$

we can get $$\frac{d}{d\tau_1} X_1 = 2R_1 \left( 1 - \frac{3\tau_1^2}{10} + \frac{5\tau_1^4}{216} - \frac{7\tau_1^6}{9360} \right), \quad \text{formula 8f-1}$$

and $$\frac{d}{d\tau_1}(R_1 \sin \tau_1) = R_1 \cos \tau_1. \quad \text{formula 8f-2}$$

In the formula 6e, it is $$X_2 = 2R_2 \left\{ (t\tau_1) - \frac{(t\tau_1)^3}{10} + \frac{(t\tau)^5}{216} - \frac{(t\tau_1)^7}{9360} \right\},$$

we can get $$\frac{d}{d\tau_1} X_2 = 2R_2 t \left\{ 1 - \frac{3(t\tau_1)^2}{10} + \frac{5(t\tau)^4}{216} - \frac{7(t\tau_1)^6}{9360} \right\}, \quad \text{formula 8f-3}$$

and $$\frac{d}{d\tau_1}\{R_2 \sin(t\tau_1)\} = R_2 t \cos(t\tau_1). \quad \text{formula 8f-4}$$

When inputting the formulas 8f-1 through 8f-4 into the formula 8f, we can get $$\frac{d}{d\tau_1} X_M$$

as follows.

$$\frac{d}{d\tau_1} X_M = 2R_1 \left( 1 - \frac{3\tau_1^2}{10} + \frac{5\tau_1^4}{216} - \frac{7\tau_1^6}{9360} \right) - R_1 \cos \tau_1 + \quad \text{formula 8g}$$

$$2R_2 t \left\{ 1 - \frac{3(t\tau_1)^2}{10} + \frac{5(t\tau_1)^4}{216} - \frac{7(t\tau_1)^6}{9360} \right\} - R_2 t \{\cos(t\tau_1)\}.$$

Therefore, when inputting $$\frac{d}{d\tau_1} X_M$$

of the formula 8g into the formula 8e, we can get the fifth item of the formula 8 of $$\frac{d}{d\tau_1}\sqrt{(R_1 + D + R_2)^2 - X_M^2} = \frac{-X_M}{\sqrt{(R_1 + D + R_2)^2 - X_M^2}} * \quad \text{formula 8h}$$

$$\left\{ 2R_1 \left( 1 - \frac{3\tau_1^2}{10} + \frac{5\tau_1^4}{216} - \frac{7\tau_1^6}{9360} \right) - R_1 \cos \tau_1 + 2R_2 t \right.$$

$$\left. \left\{ 1 - \frac{3(t\tau_1)^2}{10} + \frac{5(t\tau_1)^4}{216} - \frac{7(t\tau_1)^6}{9360} \right\} - R_2 t \cos(t\tau_1) \right\}.$$

When inputting the differentiated formulas into the formula 8, we can get the final equation of $$F'(\tau_1) = \frac{d}{d\tau_1} F(\tau_1)$$

as follows.

$$F'(\tau_1) = \frac{2}{3} R_1 \left( 2\tau_1 - \frac{4\tau_1^3}{14} + \frac{6\tau_1^5}{440} - \frac{8\tau_1^7}{25200} \right) + \quad \text{formula 9}$$

$$\frac{2}{3} R_2 \left( 2t^2 \tau_1 - \frac{4t^4 \tau_1^3}{14} + \frac{6t^6 \tau_1^5}{440} - \frac{8t^8 \tau_1^7}{25200} \right) -$$

$$R_1 \sin \tau_1 - R_2 t \sin(t\tau_1) +$$

$$\frac{X_M}{\sqrt{(R_1 + D + R_2)^2 - X_M^2}} * \left\{ 2R_1 \left( 1 - \frac{3\tau_1^2}{10} + \frac{5\tau_1^4}{216} - \frac{7\tau_1^6}{9360} \right) - \right.$$

$$R_1 \cos \tau_1 + 2R_2 t \left\{ 1 - \frac{3(t\tau_1)^2}{10} + \frac{5(t\tau_1)^4}{216} - \frac{7(t\tau_1)^6}{9360} \right\} -$$

$$\left. R_2 t \cos(t\tau_1) \right\}.$$

here, in the formula 9, the value of $X_M$ can be calculated with the formula 6f and can be inputted.

5. Computation Method of $A_1$, $A_2$ Using Non-Linear Equation

When resolving the formula of $F(\tau_1)$, $F'(\tau_1)$ in the formulas 7 and 9 based on Newton-Raphson), we can get the tangential angle of $\tau_1$ with respect to $R_1$, we can easily get $A_1, A_2$ with respect to $R_1$, $R_2$. Now, the flow chart of the method for getting the resolution based on Newton-Raphson is shown in FIG. 7. We assume that the accuracy of the calculation of the tangential angle $\tau_1$, is $10^{-6}$. The functions F and F' can be expressed with the smoothing curve length $L_1$, not with the tangential angle $\tau_1$ as follows.

$$F(L_1) = L_1^2\left(1 - \frac{L_1^2}{56R_1^2} + \frac{L_1^4}{7040R_1^4} - \frac{L_1^6}{1612800R_1^6}\right) +$$

$$\frac{L_2^2}{6R_2}\left(1 - \frac{L_2^2}{56R_2^2} + \frac{L_2^4}{7040R_2^4} - \frac{L_2^6}{1612800R_2^6}\right) +$$

$$R_1\text{Cos}\left(\frac{L_1}{2R_1}\right) + R_2\text{Cos}\left(t\frac{L_1}{2R_2}\right) - \sqrt{(R_1+D+R_2)^2 - X_M^2}$$

$$F'(L_1) = \frac{1}{6R_1}\left(2L_1 - \frac{4L_1^3}{56R_1^2} + \frac{6L_1^5}{7040R_1^4} - \frac{8L_1^7}{161280R_1^6}\right) +$$

$$\frac{1}{6R_2}\left(2t^2L_1 - \frac{4t^4L_1^3}{56R_2^2} + \frac{6t^6L_1^5}{7040R_2^4} - \frac{8t^8L_1^7}{161280R_2^6}\right) -$$

$$\frac{1}{2}\text{Sin}\left(\frac{L_1}{2R_1}\right) - t\text{Sin}\left(t\frac{L_1}{2R_2}\right) +$$

Here, in the case that it is used in the function of $L_1$, in order to obtain the same value $A_1$ as the case of $\tau_1$, we can get $$\tau = \frac{L}{2R}$$

based on the clothoid formula, so that in the above flow chart, the accuracy degree should be $$10^{-6} * \frac{1}{2R_1}$$

instead of $10^{-6}$.

The flow chart of the S type clothoid parameter calculation method of FIG. 7 will be described.

In a method for calculating a S shape clothoid parameter including a unknown clothoid parameter A adapted to radius ($R_1$ $R_2$ of two circles, the shortest distance between circumferential portions of two circles and two circles, there is a method for calculating a S shape clothoid parameter, comprising a step in which an initial value of a tangential angle $\tau_1$ is set; a step in which the value of $(R_1+D+R_2)^2-Xm^2$ is calculated in such a manner that the tangential angle ($\tau_1$) is compared, and when a result of the comparison is below 0°, since it means there is not any resolution, the process is stopped, and when a result of the same is over 0°, the process is continued; a step in which the value of $(R_1+D+R_2)^2-Xm^2$ is compared with 0, and when a result of the comparison is below 0, the tangential angle is properly adjusted, and the routine goes back to the step for setting the initial value of the tangential value of ($\tau_1$), and when a result of the same is over 0, a different fixed rate formula is set up with respect to two circles, and one formula is formed by adding the left and right items in two formulas, for thereby obtaining a tangential angle ($\tau_1$); a step in which the function $F(\tau_1)$ of the tangential angle ($\tau_1$) and the function are differentiated with the tangential angle ($\tau_1$) for thereby calculating the differential function $F'(\tau_1)$; a step in which the ratio [$G=(F(\tau_1)/F'(\tau_1)$] of two functions for [($F(\tau_1), F'(\tau_1)$] are calculated; and a step in which the absolute value of the ratio(G) is compared with a permissible error (10-6), and as a result of the comparison when it is over the permissible error, the initial value of the tangential value ($\tau_s$) is set, and the routine is fed back to the next step of the step that the initial value is set, and when it is below the permissible error, the tangential angle ($\tau_1$) is determined, and the parameter value A is calculated using the tangential angle ($\tau_1$).

6. Calculation Examples of $A_1$, $A_2$ in S type Clothoid 1) in the case that $A_1=A_2$(namely, Symmetrical Type).

EXAMPLE 1

When input specification is $R_1$=250, $R_2$=200, D≈15.088, K=1,

As a result of the calculation, $A_1=A_2$=149.99802855 can be calculated with about four calculations.

The distance between the center points of two circles using the element values of the clothoid of two circles can be calculated using $A_1$, $A_2$ for thereby obtaining $R_1+D+R_2$.

In the case that we use $L_1$ instead of $\tau_1$, the value having a desired accuracy can be obtained with about 40~50 calculations. The distance between the center points of two circles can be calculated like the case of $\tau_1$ using $A_1$, $A_2$ and the clothoid element values of two circles, so that there is a very small difference of about $10^{-8}$~$10^{-10}$ as compared with $R_1+D+R_2$.

EXAMPLE 2

In the case that $R_1$=200, $R_2$=120, D=105.6,

As a result of the above algorithm, we can get $A_1 \approx A_2 \approx 190.00785$.

2) In the case of $A_1 \neq A_2$(Namely, Non-Symmetrical)

Input data: in the case of $$R_1 = 230, R_2 = 180, D = 26.5, K = \frac{A_2}{A_1} = 0.8,$$

A result of the calculation: five calculations

A1=181.340639936522, A2=145.072511949218 verification is $$K = \frac{A_2}{A_1} = \frac{145.072511949218}{181.340639936522} = 0.8$$

Xm1=71.2582950417867, Xm2=58.2562467892329, XM=129.51454183102

Ym1=233.690522740909, Ym2=183.152653350893, YM=416.843176091802

When calculating the value of D, we can get $\sqrt{X_M^2+Y_M^2}$=436.5 in $(R_1+D+R_2)^2=X_M^2+Y_M^2$, and D=436.5−(230+180)=26.5. The above value is matched with the values given as the specification.

Second Embodiment

Calculation Method of Egg Type Clothoid Parameter in Egg Type Design

1. Shape of Egg Type

When the egg type is installed, we can get the final shape of FIG. 6. At this time, in the clothoid curve, the range of the radius of $R_f$~$R_s$ among the smoothing curve generated by the parameter $A_E$ can be used, and the larger circle and the smaller circle are connected using the smoothing curve.

2. Basic Concept of the Calculation of the Parameter A in the Egg Type

In order to geometrically explain the calculation formulas in the egg type, the symbols related to the egg type clothoid curve in FIG. 6 are indicated as the subscripts of $_{E1}$, $_{E2}$, and the data with respect to the larger circle in the egg type clothoid curve are indicated with the subscripts of $_1$, and the data of the smaller circle are indicated with the subscripts of $_2$.

From now on, the subscript of $_1$ represents the larger circle, and the subscript of $_2$ represents the smaller circle. In the egg type, the classifications of the larger and smaller circles are very important. As the conditions of the egg type, there are ① the larger circle should fully contain the smaller circle. ② the centers of two circles should not be the same (non-concentrical). As shown in FIG. 6, the key points in the egg type design are to recognize the coordinates of KAE and KEE in which the egg type clothoid contacts with the larger circle and the smaller circle. This coordinate can be easily obtained when knowing the egg type clothoid parameter value A.

1) Specification Needed

The following three values are needed in order to calculate the egg type clothoid parameter A using the radius of $R_1$, $R_2$ of two circles.

① Radius $R_1$ of larger circle
② Radius of $R_2$ of smaller circle
③ Minimum distance between larger circle and smaller circle 2) Approaching Method of Formula Induction The calculation formula of the value A is induced from the different fixed rate calculation formula in the clothoid.

Namely, since $\Delta R=Y+R \cos \tau-R$, we can get $Y+R \cos \tau-R-\tau R=0$. Therefore, when adapting the unknown parameter A, the different fixed rate formula with respect to $R_1$, $R_2$ can be expressed as follows.

$$Y_1+R_1 \cos \tau_1-R_1\tau R= \qquad \text{formula 1}$$

$$Y_2+R_2 \cos \tau_2-R_2-\tau R_{2=0}\text{—formula 2}$$

In the egg type, since the different fixed rate of the smaller circle with respect to the parameter A is always larger than the different fixed rate with respect to the larger circle, the formula 1 is subtracted from the formula 2, and assuming that the result of the calculation is the function F, we can get the following.

$$F=Y_2-Y_1+R_2 \cos \tau_2-R_1 \cos \tau_1+(R_1+\Delta R_1)-(R_2+\Delta R_2)$$
$$=0 \qquad \text{formula 3}$$

The different fixed rate formula of $\Delta R=Y+R \cos \tau-R$ can be expressed with radius, smoothing curve length(R, L) or radius and tangential angle(R, τ), so that the function F can be expressed with $R_1$, $R_2$,$L_1$, $L_2$ or $R_1$, $R_2$,$\tau_1$,$\tau_2$. Since the values of $R_1$, $R_2$ are given values, namely, constant values, the function F can be expressed in the function of $L_1$, $L_2$ or $\tau_1$,$\tau_2$.

In the relationship between the values of $L_1$ and $L_2$, since $R_1L_1=R_2L_2$ in the clothoid formula of $A^2=RL$, we can get $$L_2 = \frac{R_1}{R_2}L_1.$$

Namely, since the value $L_2$ can be expressed in the formula of $L_1$, the function $L_2$ is the function with respect to $L_1$. In the same manner, since $2\tau_1R_1^2=2\tau_2R_2^2$ in the clothoid formula of $A^2=2\tau R^2$, $2\tau_1R_1^2=2\tau_2R_2^2$, we can get $$\tau_2 = \left(\frac{R_1}{R_2}\right)^2 \tau_1.$$

assuming that $$t = \left(\frac{R_1}{R_2}\right)^2, \qquad \text{formula 4}$$

$$\tau_2 = t\tau_1 \qquad \text{formula 5.}$$

Therefore, $\tau_2$ can be expressed in the formula of $\tau_1$, and the function $\tau_2$ is the function with respect to $\tau_1$.

Therefore, since the function F of the formula 3 can be expressed with $L_1$ or $\tau_1$, it can be expressed in the functions of $F(L_1)$ or $F(\tau_1)$.

In the present invention, the function F of formula 3 can be developed in the formula of $F(\tau_1)$. Therefore, the formula 3 can be expressed in the function of the tangential angle $\tau_1$ with respect to the radius $R_1$.

$$F(\tau_1)=Y_2-Y_1+R_2 \cos \tau_2-R_1\cos \tau_1+\{(R_1+\Delta R_1)-(R_2+\Delta R_2)\} \qquad \text{formula 6}$$

It is impossible to obtain the resolution of the function $F(\tau_1)$ with only the formula 6. However, the resolution can be obtained using the non-linear equation. Namely, when differentiating the function $F(\tau_1)$ with respect to $\tau_1$, namely, $$F'(\tau_1) = \frac{d}{d\tau_1}F(\tau_1),$$

for thereby forming the function of $F'(\tau_1)$. When resolving the functions $F(\tau_1)$ and $F'(\tau_1)$ based on the non-linear equation, we can obtain the value of $\tau_1$. When the value of $\tau_1$ is obtained, we can easily obtain the value A based on the clothoid formula.

3) Reference Matters

In the formula 6, we obtained the value of $\tau_1$ by expressing the function in the function of $\tau_1$. It does not need to always calculate the same in the function of $\tau_1$ Namely, even when it is resolved in the functions of $F(L_1)$, $F'(L_1)$ with respect to the function of $L_1$, we can get the same result. In addition, the values of $L_2$ or $\tau_2$ can be obtained using the functions of $F(L_2)$, $F'(L_2)$ or $F(\tau_2)$, $F(\tau_2)$, and then the value A is obtained. In this case, we can also get the same result.

When obtaining the resolution of the non-linear equation and comparing the tangential angle $\tau_1$ and smoothing curve $L_1$, it is possible to faster calculate the value of $\tau_1$, using the function $F(\tau_1)$ as compared to when calculating the same using $F(L_1)$. In addition, the value is obtained using $\tau_1$, $L_1$, and then the element values of the clothoid of two circles are computed using the calculated values A, and the value D is calculated using the coordinates of the center points of two circles. In order to obtain the same result as the value D that is in the input specification, the accuracy should be significantly smaller as compared to the function $F(\tau_1)$ in the case of the function $F(L_1)$ when calculating in the non-linear equation.

In the clothoid formula, since it is $L=2\tau R$ in the case that the function of L is used for the same result, it is needed to obtain the value significantly smaller as compared to when using the function $\tau$.

Therefore, since the above reasons and the expressions of the functions are relatively simple in the data of the present invention, the function of $F(\tau_1)$ is used without using the formula 3 as the function of $F(L_1)$.

3. Development of the Function $F(\tau_1)$

Each items placed in the formula 6 of $F(\tau_1)=Y_2-Y_1+R_2 \cos \tau_2-R_1 \cos \tau_1+\{(R_1+\Delta R_1)-(R_2+\Delta R_2)\}$ can be expressed with the constant values of $R_1$, $R_2$, D and the unknown value of $\tau_1$ Namely, all items placed in the right side can be expressed in the function of $\tau_1$.

In the clothoid formula, since it is $A^2=2\tau R^2$, we can get $A=\sqrt{2\tau}R$ therefore, $A\sqrt{2\tau}=2\tau R$.

$$X = A\sqrt{2\tau}\left(1 - \frac{\tau^2}{10} + \frac{\tau^4}{216} - \frac{\tau^6}{9360}\right) = 2\tau R\left(1 - \frac{\tau^2}{10} + \frac{\tau^4}{216} - \frac{\tau^6}{9360}\right)$$

$$\therefore X = 2R\left(\tau - \frac{\tau^3}{10} + \frac{\tau^5}{216} - \frac{\tau^7}{9360}\right)$$

$$Y = \frac{\sqrt{2}}{3}A\sqrt{\tau^3}\left(1 - \frac{\tau^2}{14} + \frac{\tau^4}{440} - \frac{\tau^6}{25200}\right) =$$

$$\frac{\sqrt{2}}{3}A\sqrt{2\tau}\sqrt{\tau^3}R\left(1 - \frac{\tau^2}{14} + \frac{\tau^4}{440} - \frac{\tau^6}{25200}\right)$$

$$\therefore Y = \frac{2}{3}R\left(\tau^2 - \frac{\tau^4}{14} + \frac{\tau^6}{440} - \frac{\tau^8}{25200}\right)$$

The first item $Y_2$ can be expressed in the function of $\tau_1$ in the clothoid.

In the formula 5, since it is $\tau_2=t\tau_1$, $$Y_2 = \frac{2}{3}R_2\left\{(t\tau_1)^2 - \frac{(t\tau_1)^4}{14} + \frac{(t\tau_1)^6}{440} - \frac{(t\tau_1)^8}{25200}\right\} \quad \text{formula 6a}$$

The second item $Y_1$ can be expressed in the function of $\tau_1$ in the clothoid.

$$Y_1 = \frac{2}{3}R_1\left(\tau_1^2 - \frac{\tau_1^4}{14} + \frac{\tau_1^6}{440} - \frac{\tau_1^8}{25200}\right) \quad \text{formula 6b}$$

The third item $R_2 \cos \tau_2$ can be expressed in the function of $\tau_1$ because it is $\tau_2=t\tau_1$ in the formula 5.

$$R_2 \cos \tau_2 = R_2 \cos(t\tau_1) \quad \text{formula 6c}$$

The last fifth item $(R_1+\Delta R_1)-(R_2+\Delta R_2)$ can be expressed as follows.

Assuming that the coordinate of the unknown center point of the larger circle is $M_1$, and the coordinate of the unknown center point of the smaller circle is $M_2$, the distance $\overline{M_1M_2}$ of the center points of two circles is $M_1M_2$ 에서 $(\overline{M_1M_2})^2=(\overline{M_1P})^2+(\overline{M_2P})^2$ in the triangle $M_1M_2P$ of FIG. 6, we can get $$\overline{M_1M_2}=(R_1-R_2-D), \quad \overline{M_1P}=(R_1+\Delta R_1)-(R_2+\Delta R_2),$$
$$\overline{M_2P}=X_{M2}-X_{M1}.$$

Therefore, $(R_1+\Delta R_1)-(R_2+\Delta R_2)=\sqrt{(\overline{M_1M_2})^2-(X_{M2}-X_{M1})^2}$.

$$\therefore (R_1+\Delta R_1)-(R_2+\Delta R_2)=\sqrt{(R_1-R_2-D)^2-(X_{M2}-X_{M1})^2} \quad \text{formula 6d}$$

In the clothoid formula of $X_M=X-R_1 \sin \tau_1$ it is $X_{M1}=X_1-R_1\sin \tau_1$, $X_{M2}=X_2-R_2 \sin \tau_2$.

$$Y_1 = 2R_1\left(\tau_1 - \frac{\tau_1^3}{10} + \frac{\tau_1^5}{216} - \frac{\tau_1^7}{9360}\right), \quad \text{formula 6d-1}$$

and

In $$X_2 = 2R_2\left(\tau_2 - \frac{\tau_2^3}{10} + \frac{\tau_2^5}{216} - \frac{\tau_2^7}{9360}\right),$$

since it is $\tau_2=t\tau_1$ based on the formula 5, it is $$X_2 = 2R_2\left\{(t\tau_1) - \frac{(t\tau_1)^3}{10} + \frac{(t\tau_1)^5}{216} - \frac{(t\tau_1)^7}{9360}\right\} \quad \text{formula 6d-2}$$

Therefore, when the formulas 6d-1 and 6d-2 are inputted into the formula 6d, we can get $\tau_2=t\tau_1$, so that the equation of $X_{M1}-X_{M1}$ is as follows.

$$X_{M2} - X_{M1} = \quad \text{formula 6d-3}$$
$$2R_2\left\{(t\tau_1) - \frac{(t\tau_1)^3}{10} + \frac{(t\tau_1)^5}{216} - \frac{(t\tau_1)^7}{9360}\right\} -$$
$$R_2 \sin(t\tau_1) -$$
$$\left\{2R_1\left(\tau_1 - \frac{\tau_1^3}{10} + \frac{\tau_1^5}{216} - \frac{\tau_1^7}{9360}\right) - R_1 \sin \tau_1\right\}$$

Therefore, the formula 6d can be expressed as follows.

$$(R_1+\Delta R_1)-(R_2+\Delta R_2)=\sqrt{(R_1-R_2-D)^2-a^2} \quad \text{formula 6e}$$

wherein the value of a in the formula 6e is as follows.

$$a = 2R_2\left\{(t\tau_1) - \frac{(t\tau_1)^3}{10} + \frac{(t\tau_1)^5}{216} - \frac{(t\tau_1)^7}{9360}\right\} -$$
$$R_2 \sin(t\tau_1) - \left\{2R_1\left(\tau_1 - \frac{\tau_1^3}{10} + \frac{\tau_1^5}{216} - \frac{\tau_1^7}{9360}\right) - R_1 \sin \tau_1\right\}$$

When the formulas 6a, 6b, 6c and 6e are inputted into the first, second, third and fifth items placed in the right side of the formula 6, we can get the function $F(\tau_1)$ as follows.

$$F(\tau_1) = \frac{2}{3}R_2\left\{(t\tau_1)^2 - \frac{(t\tau_1)^4}{14} + \frac{(t\tau_1)^6}{440} - \frac{(t\tau_1)^8}{25200}\right\} - \quad \text{formula 7}$$
$$\frac{2}{3}R_1\left(\tau_1^2 - \frac{\tau_1^4}{14} + \frac{\tau_1^6}{440} - \frac{\tau_1^8}{25200}\right) + R_2 \cos(t\tau_1) -$$
$$R_1 \cos \tau_1 + \sqrt{(R_1 - R_2 - D)^2 - a^2}$$

In the formula 7, $$a = 2R_2\left\{(t\tau_1) - \frac{(t\tau_1)^3}{10} + \frac{(t\tau_1)^5}{216} - \frac{(t\tau_1)^7}{9360}\right\} -$$

$$R_2\text{Sin}(t\tau_1) - \left\{2R_1\left(\tau_1 - \frac{\tau_1^3}{10} + \frac{\tau_1^5}{216} - \frac{\tau_1^7}{9360}\right) - R_1\text{Sin}\tau_1\right\}$$

When using the function $F(\tau_1)$, if the formula 7 is too long and is not easy to use, the values of the formulas 6a, 6b, 6c and 6e are calculated, and inputted into the formula 6 for thereby achieving an easier use.

It is important to recognize that when calculating the function $F(\tau_1)$, in the case that $(R_1+\Delta R_1)-(R_2+\Delta R_2) \leqq 0$ of the formula 6e, the tangential angle $\tau_1$, should be adjusted with a proper value (for example:

$$\tau_1 = \frac{\tau_1}{2}),$$

and the functions of $F(\tau_1)$ and $F'(\tau_1)$ should be calculated again.

4. Development of the Function $F'(\tau_1)$

The function of $F(\tau_1)$ is differentiated with respect to $\tau_1$, for thereby forming the function $F'(\tau_1)$, so that we can get $$F'(\tau_1) = \frac{d}{d\tau_1}F(\tau_1).$$

At this time, since the unknown values of $F'(\tau_1)$ and $F(\tau_1)$ should be expressed with only $\tau_1$, when differentiating using the formula 6, each item placed in the right side should be independently differentiated, and should be expressed with only the constant numbers of $R_1$, $R_2$, D, K and the unknown number $\tau_1$ or it is needed to differentiate based on the formula 7.

Since differentiating the formula 7 is more easy, the formula 7 is applied in the following description.

When the formula 7 itself is differentiated, since the formula of the item of $\sqrt{}$ is complicated, it is needed to differently express the item of $\sqrt{}$ as follows. Namely, it is same as the $\sqrt{(R_1-R_2-^2-(X_{M2}-X_{M1})^2}$ of the formula 6d, the formula 7 can be expressed as follows.

$$F(\tau_1) = \frac{2}{3}R_2\left\{(t\tau_1)^2 - \frac{(t\tau_1)^4}{14} + \frac{(t\tau_1)^6}{440} - \frac{(t\tau_1)^8}{25200}\right\} - \quad \text{formula8}$$

$$\left\{\frac{2}{3}R_1\left(\tau_1^2 - \frac{\tau_1^4}{14} + \frac{\tau_1^6}{440} - \frac{\tau_1^8}{25200}\right)\right\} + R_2\text{Cos}(t\tau_1) -$$

$$R_1\text{Cos}\tau_1 + \sqrt{(R_1-R_2-D)^2-(X_{M2}-X_{M1})^2}.$$

Each item placed in the right side of the formula 8 can be differentiated with respect to $\tau_1$.

When the first item is differentiated with respect to $\tau_1$, we can get $$\frac{d}{d\tau_1}\frac{2}{3}R_2\left\{(t\tau_1)^2 - \frac{(t\tau_1)^4}{14} + \frac{(t\tau_1)^6}{440} - \frac{(t\tau_1)^8}{25200}\right\} = \quad \text{formula8a}$$

$$\frac{2}{3}R_2\left(2t^2\tau_1 - \frac{4t^4\tau_1^3}{14} + \frac{6t^6\tau_1^5}{440} - \frac{8t^8\tau_1^7}{25200}\right), \text{ and}$$

when the second item is differentiated with respect to $\tau_1$, we can get $$\frac{d}{d\tau_1}\left\{\frac{2}{3}R_1\left(\tau_1^2 - \frac{\tau_1^4}{14} + \frac{\tau_1^6}{440} - \frac{\tau_1^8}{25200}\right)\right\} = \quad \text{formula8b}$$

$$\frac{2}{3}R_1\left(2\tau_1 - \frac{4\tau_1^3}{14} + \frac{6\tau_1^5}{440} - \frac{8\tau_1^7}{25200}\right).$$

In addition, the third item is differentiated with respect to $\tau_1$, we can get $$\frac{d}{d\tau_1}\{R_2\text{Cos}(t\tau_1)\} = -R_2 t\text{Sin}(t\tau_1). \quad \text{formula 8c}$$

And, when the fourth item is differentiated with respect to $r_1$, we can get $$\frac{d}{d\tau_1}(R_1\text{Cos}\tau_1) = -R_1\text{Sin}\tau_1. \quad \text{formula8d}$$

In addition, the fifth item of $\sqrt{(R_1-R_2-D)^2-(X_{MI}-X_{M1})^2}$ is differentiated with respect to $\tau_1$, assuming $X_M = X_{M2}-X_{M1}$, since $$\frac{d}{d\tau_1}\sqrt{(R_1-R_2-D)^2-X_M^2} = \quad \text{formula 8e}$$

$$\frac{d}{d\tau_1}\{(R_1-R_2-D)^2-X_M^2\}^{\frac{1}{2}}, \text{ we can get}$$

$$\frac{d}{d\tau_1}\{(R_1-R_2-D)^2-X_M^2\}^{\frac{1}{2}} =$$

$$\frac{1}{2}\{(R_1-R_2-D)^2-X_M^2\}^{\frac{-1}{2}} * \frac{d}{d\tau_1}(-X_M^2) =$$

$$\frac{1}{2\sqrt{(R_1-R_2-D)^2-X_M^2}}*(-2X_M)*\frac{d}{d\tau_1}X_M$$

$$\therefore \frac{d}{d\tau_1}\sqrt{(R_1-R_2-D)^2-X_M^2} =$$

$$\frac{-X_M}{\sqrt{(R_1-R_2-D)^2-X_M^2}}*\frac{d}{d\tau_1}X_M$$

Now $$\frac{d}{d\tau_1}X_M$$

will be developed with the function of $\tau_1$ since it is $X_M = X_{MI}-X_{M1}$ and $X_{MI}-X_{M1}$ is the formula 6d-3, we can get formula 8f $$\frac{d}{d\tau_1}X_M =$$

$$\frac{d}{d\tau_1}\left[2R_2\left\{(t\tau_1) - \frac{(t\tau_1)^3}{10} + \frac{(t\tau_1)^5}{216} - \frac{(t\tau_1)^7}{9360}\right\} - R_2\text{Sin}(t\tau_1) - \right.$$

$$\left.\left\{2R_1\left(\tau_1 - \frac{\tau_1^3}{10} + \frac{\tau_1^5}{216} - \frac{\tau_1^7}{9360}\right) - R_1\text{Sin}\tau_1\right\}\right] \therefore$$

$$\frac{d}{d\tau_1}X_M = 2R_2\left\{t - \frac{3t^3\tau_1^2}{10} + \frac{5t^5\tau_1^4}{216} - \frac{7t^7\tau_1^6}{9360}\right\} -$$

$$tR_2\text{Cos}(t\tau_1) - 2R_1\left(1 - \frac{3\tau_1^2}{10} + \frac{5\tau_1^4}{216} - \frac{7\tau_1^6}{9360}\right) + R_1\text{Cos}\tau_1$$

Now when the formula 8f is inputted into the formula 8e, the following formula 9 is obtained.

formula 9

$$\frac{d}{d\tau_1}\sqrt{(R_1-R_2-D)^2 - X_M^2} = \frac{-X_M}{\sqrt{(R_1-R_2-D)^2 - X_M^2}} *$$

$$\left[2R_2\left\{t - \frac{3t^3\tau_1^2}{10} + \frac{5t^5\tau_1^4}{216} - \frac{7t^7\tau_1^6}{9360}\right\} - tR_2\text{Cos}(t\tau_1) - \right.$$

$$\left.2R_1\left(1 - \frac{3\tau_1^2}{10} + \frac{5\tau_1^4}{216} - \frac{7\tau_1^6}{9360}\right) + R_1\text{Cos}\tau_1\right]$$

Therefore, the last formula of $$F'(\tau_1) = \frac{d}{d\tau_1}F(\tau_1)$$

is as follows.

formula 10

$$F'(\tau_1) = \frac{2}{3}R_2\left(2t^2\tau_1 - \frac{4t^4\tau_1^3}{14} + \frac{6t^6\tau_1^5}{440} - \frac{8t^8\tau_1^7}{25200}\right) -$$

$$\frac{2}{3}R_1\left(2\tau_1 - \frac{4\tau_1^3}{14} + \frac{6\tau_1^5}{440} - \frac{8\tau_1^7}{25200}\right) - R_2t\text{Sin}(t\tau_1) +$$

$$R_1\text{Sin}\tau_1 - \frac{X_M}{\sqrt{(R_1+D+R_2)^2 - X_M^2}} *$$

$$\left[2R_2\left\{t - \frac{3t^3\tau_1^2}{10} + \frac{5t^5\tau_1^4}{216} - \frac{7t^7\tau_1^6}{9360}\right\} - tR_2\text{Cos}(t\tau_1) - \right.$$

$$\left.2R_1\left(1 - \frac{3\tau_1^2}{10} + \frac{5\tau_1^4}{216} - \frac{7\tau_1^6}{9360}\right) + R_1\text{Cos}\tau_1\right]$$

wherein, in the formula 10, it is $X_M = X_{MI} - X_{M1}$, and the formula of $X_{MI} - X_{M1}$ is the formula 6d-3.

The formula 10 is obtained by developing the function of $F'(\tau_1)$. When it is too long to use it, the values of each item in the formula 6 or 7 are independently calculated for thereby calculating $F'(\tau_1)$. When calculating the same by differentiating the formulas 10 and 6, it is needed to consider to omit ± in each item in the formula 10, we can get the first item of $$\frac{d}{d\tau_1}(Y_2),$$

the second item of $$\frac{d}{d\tau_1}(Y_1),$$

the third item of $$\frac{d}{d\tau_1}(R_2\text{Cos}\tau_2),$$

the fourth item of $$\frac{d}{d\tau_1}(R_1\text{Cos}\tau_1),$$

the fifth item of $$\frac{d}{d\tau_1}\{(R_1+\Delta R_1) - (R_2+\Delta R_2)\}.$$

5. Calculation of the Egg Type Clothoid Using the Non-Linear Equation

When resolving the functions of $F(\tau_1)$, $F'(\tau_1)$ of the formulas 7 and 10 based on the Newton-Raphson equation, it is possible to get the tangential angle $\tau_1$, at the larger circle $R_1$ with respect to the parameter A, so that it is easy to get the parameter A from $A^2 = 2\tau_1 R_1^2$. In addition, we can get a flow chart illustrating a method for calculating the resolutions based on Newton-Raphson as follows. As shown therein, the accuracy of the calculation of the tangential angle $r_1$ is $10^{-6}$.

FIG. 8 is a flow chart illustrating the method for calculating the egg type clothoid parameters.

As shown therein, in a method for calculating a S shape clothoid parameter including a unknown clothoid parameter A adapted to radius ($R_1$, $R_2$) of two circles, the shortest distance between circumferential portions of two circles and two circles, there is provided a method for calculating an egg type clothoid parameter, comprising a step in which an initial value of a tangential angle $\tau_1$ is set; a step in which the value of $(R_1-R_2-D)^2 - Xm^2$ is calculated in such a manner that the tangential angle ($\tau_1$) is compared, and when a result of the comparison is below 0°, since it means there is not any resolution, the process is stopped, and when a result of the same is over 0°, the process is continued; a step in which the value of $(R_1-R_2-D)^2 - Xm^2$ is compared with 0, and when a result of the comparison is below 0, the tangential angle is properly adjusted, and the routine goes back to the step for setting the initial value of the tangential value of ($\tau_1$), and when a result of the same is over 0, a different fixed rate formula is set up with respect to two circles, and one formula is formed by adding the left and right items in two formulas, for thereby calculating $F'(\tau_1)$ by differentiating the function F($\tau_1$) of the tangential angle($\tau_1$) and the function with the tangential angle ($\tau_1$); a step in which the ratio of [G=F($\tau_1$)/F'($\tau_1$)] of two functions of is calculated; a step in which the tangential angle of $\tau_1=\tau_1-G$ is calculated; and a step in which the absolute value of the ratio (G) is compared with a permissible error ($10^{-6}$), and as a result of the comparison when it is over the permissible error, the initial value of the tangential value ($\tau_1$) is set, and the routine is fed back to the next step of the step that that initial value is set, and when it is below the permissible error, the tangential angle ($\tau_1$) is determined, and the parameter value A is calculated using the tangential angle ($\tau_1$).

6. Calculation Examples of Parameter A of Egg Type Clothoid (Example 1): in the case that $R_1$=900, $R_2$=400, D=7, and When calculating using the table: A=501.259, value verification=6.932

A result when calculating using the above algorithm: calculated in 10 times

A=501.203337170923,

A result of the calculation of the verification D=7.00000000000007

Example 2

In the Case that $R_1$=500, $R_2$=120, D=2

When calculating using the diagram: A≈200
A result when calculating using the above algorithm: calculated in 7 times

A=205.507481180975,

A result of calculation of verification D=2.00000000000003

In the present invention, there ar provided the drawings adapting the methods for calculating the S type and egg type parameter values A. FIG. 9 is a view of a forward direction egg type design, and FIG. 10 is a view of a backward direction egg type design, and FIG. 11 is a view of a S shape egg type design.

Figure 1:
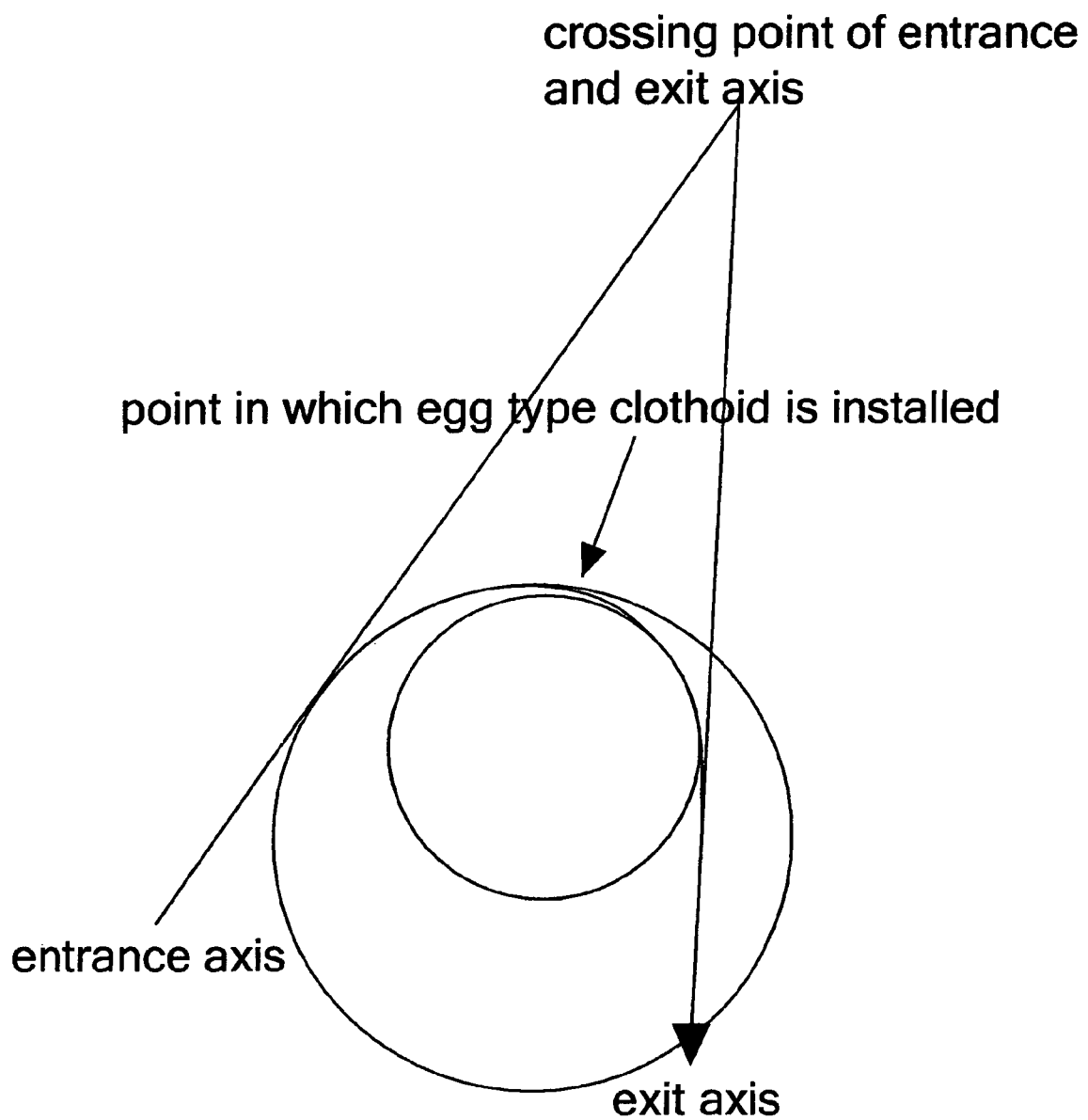
FIG. 1 is a view illustrating a forward direction egg type.
Figure 2:
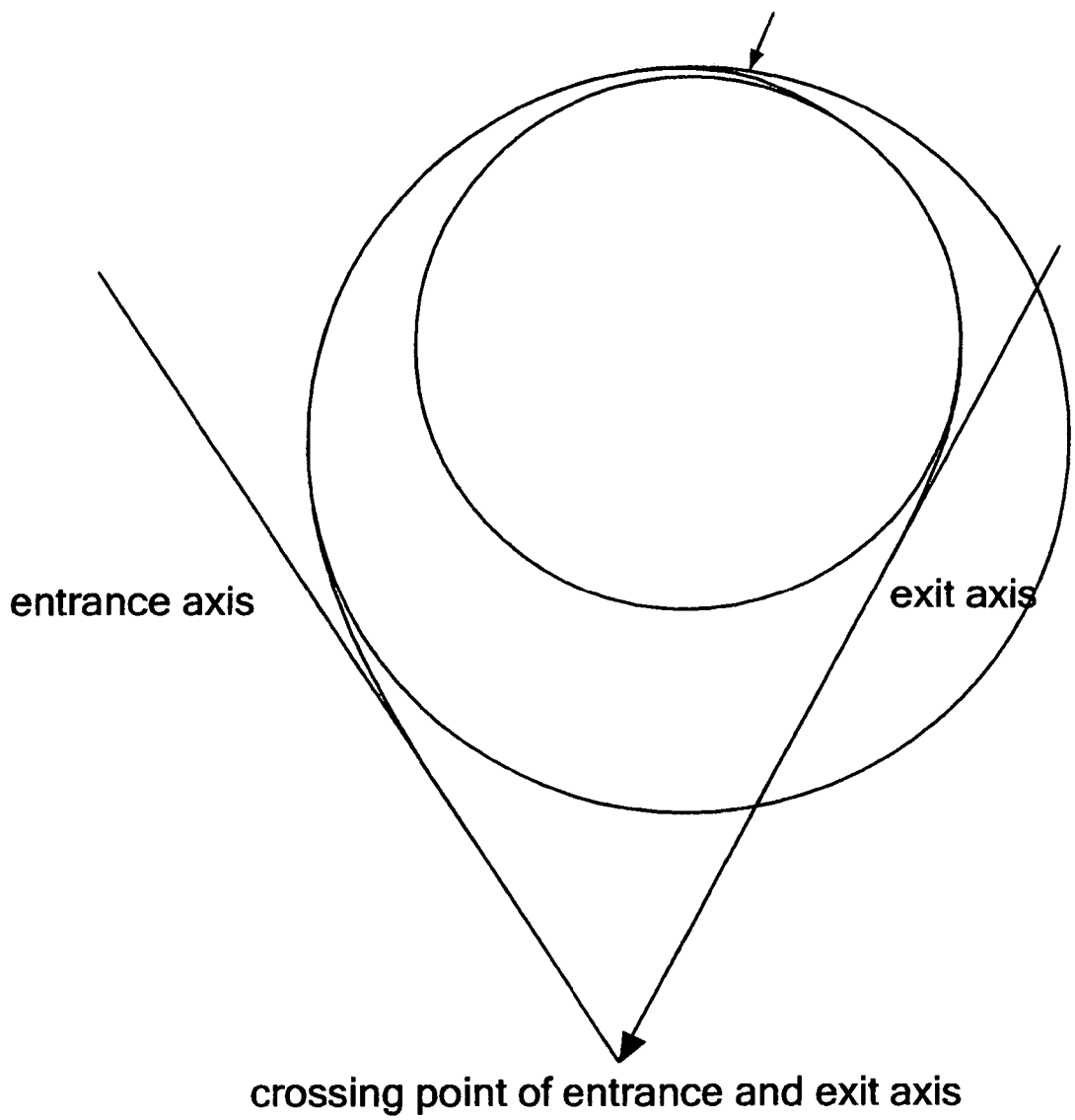
FIG. 2 is a view illustrating a backward direction egg type.
Figure 3:
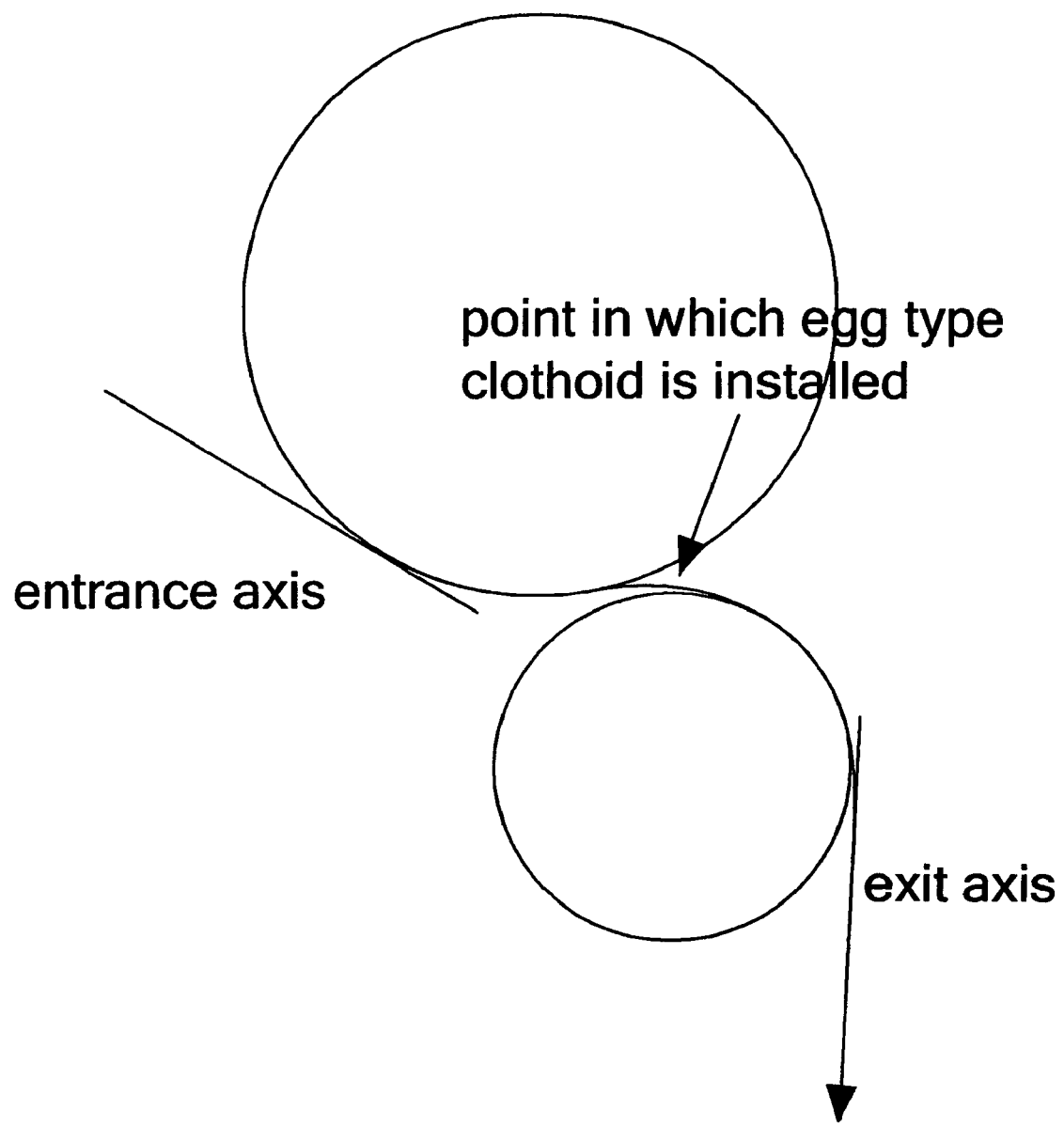
FIG. 3 is a view illustrating a S-shaped egg type.
Figure 4:
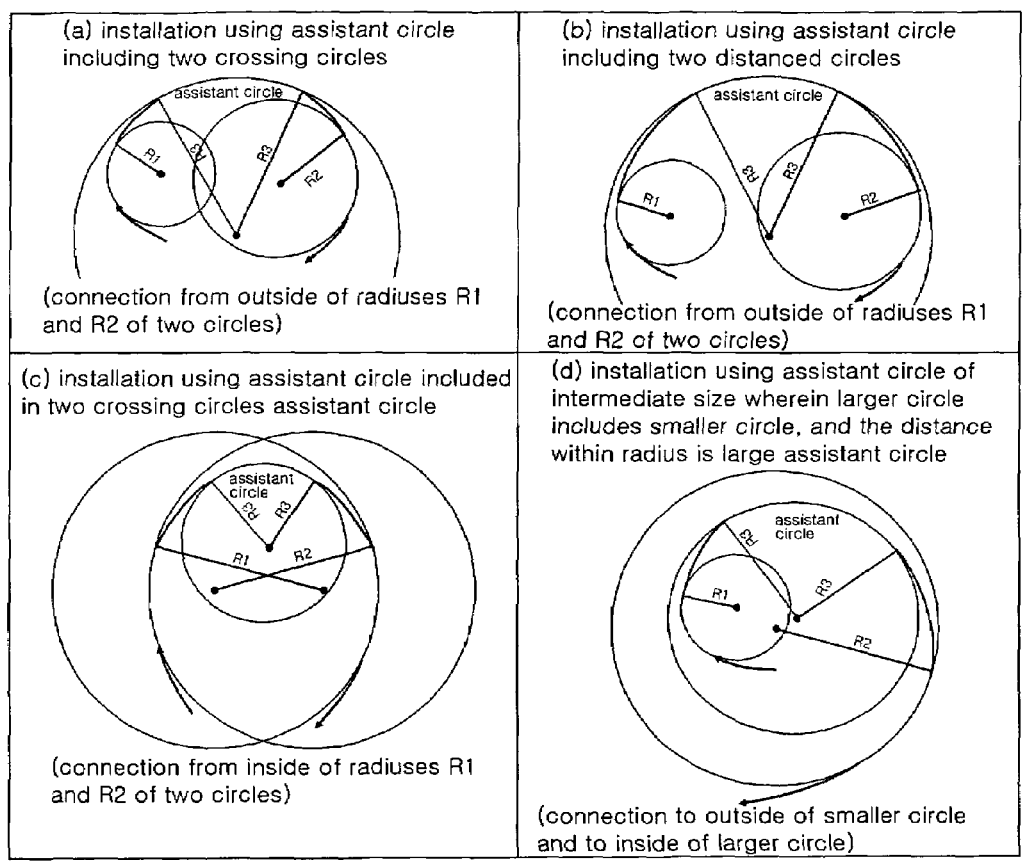
FIG. 4 is a view illustrating a double egg type.

Here, the double egg type represents that the type that two egg types are continuously connected using an assistant circle when two circles are crossed or distanced. FIG. 4 is a view of four types of the double egg type. As shown therein, there are (i)the type using an assistant circle including two crossing circles, (ii) the type using an assistant circle including two distanced circles, (iii) the type using an assistant circle included in two crossing circles, and (iv) the type using an assistant circle because the distance in the radius of two circles is large.

FIG. 12 is a view illustrating a double egg type using an assistant circle having two crossing circles according to the present invention, FIG. 13 is a view illustrating a double egg type using an assistant circle having two distanced circles according to the present invention, FIG. 14 is a view illustrating a double egg type using an assistant circuit having two crossing circles according to the present invention, FIG. 15 is a view illustrating a double egg type using an assistant circle because a distance between the distances in the radiuses of two circles according to the present invention, and FIG. 16 is a view illustrating a design example of a triple egg type according to the present invention.

Since the double egg type represents the type that two egg types are arranged in series, it is needed to independently design two egg types. Therefore, when continuously calculating using the egg type design method, it is possible to achieve a design of the double egg type. In addition, the egg type having more than double can be designed in the same manner as the above method.

The complex type clothoid is not well matched with the egg type. There are differences between the complex and egg types in that a circular portion with respect to the larger circle exists in the egg type, but it does not exist in the complex type(namely, the length of the circle and the center angle of the circle are all 0). Namely, as shown in FIG. 6, there in only one difference in that KAE and KEE are placed in different places but are same in the complex type.

The method for calculating the parameter A of the complex clothoid is the same as the method for calculating the parameter A in the egg type clothoid. When the parameter is obtained, it is possible to easy to design the complex type clothoid. The design itself of the complex type clothoid can directly adapt the egg type design method. In this case, the center angle of the circle with respect to the larger circle should be processed with 0. Therefore, in the present invention, the method for calculating the parameter A of the egg type clothoid can be directly adapted to the method for calculating the parameter A in the complex type clothoid.

Figure 17:
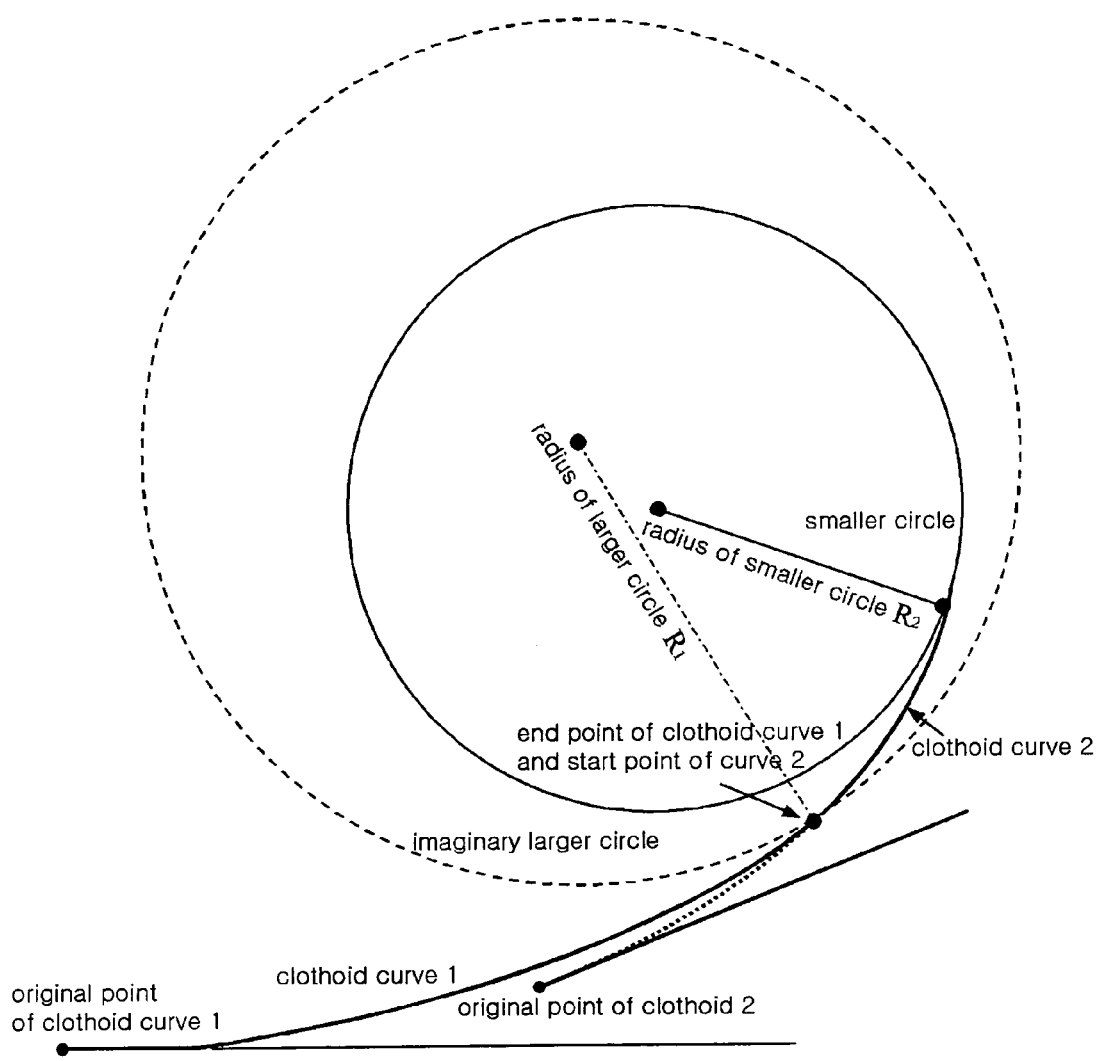
FIG. 17 is a view illustrating a complex type clothoid construction according to the present invention.
Figure 18:
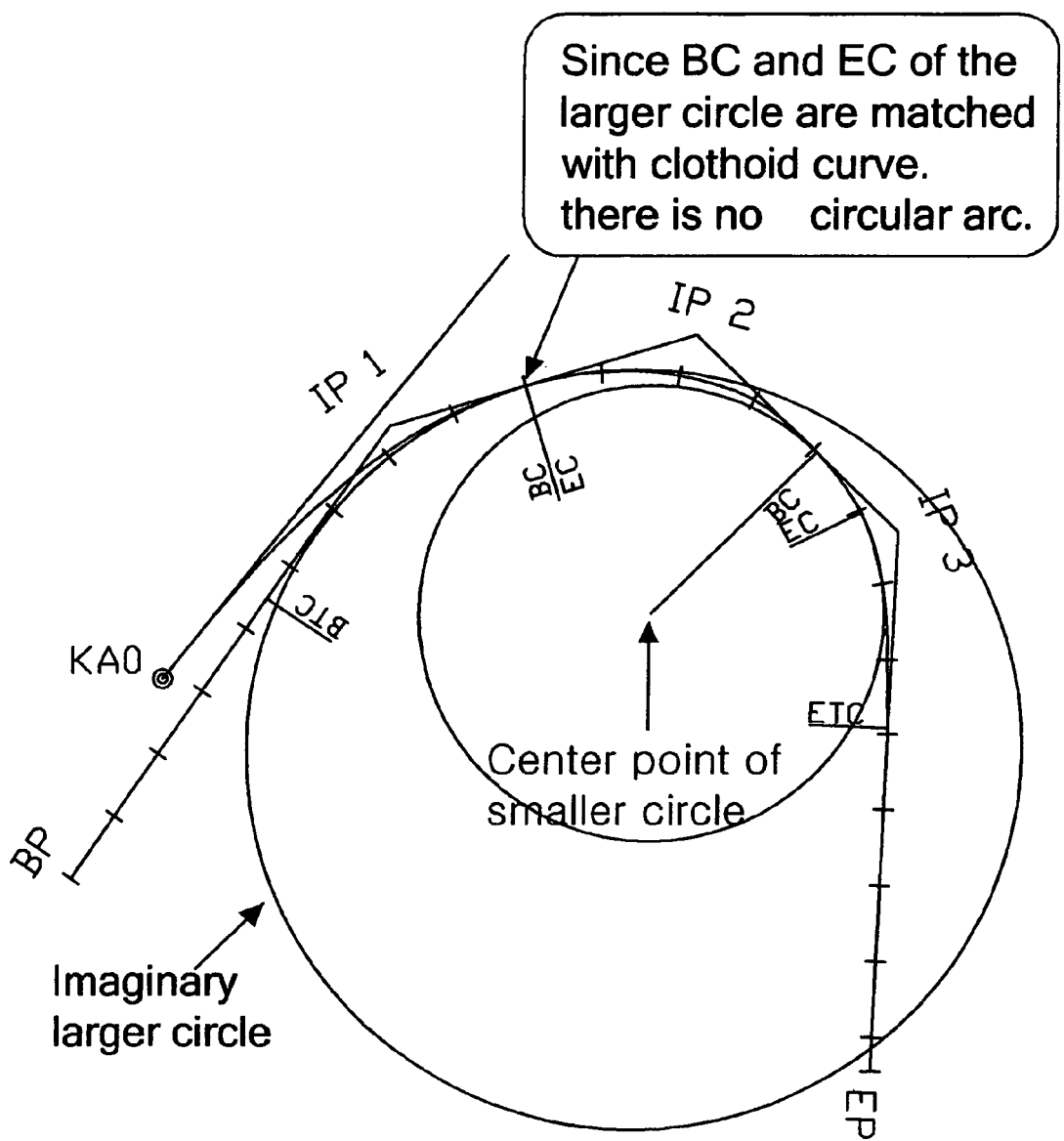
FIG. 18 is a view illustrating a complex type clothoid according to the present invention.

FIG. 17 is a view illustrating the construction of the complex type clothoid, and FIG. 18 is a view illustrating an example of the complex type clothoid.

The method for calculating the parameter values of the S type, complex type and egg type clothoid for the design of roads according to the present invention are provided for the purposes of descriptions.

As described above, in the present invention, it is possible to easily calculate the clothoid parameters A in the road designs of the S type, complex type and egg type. It is possible to achieve a fast road design for thereby decreasing the period of road construction.

In addition, the design specification can be calculated without CAD, and the S type and egg type road designs can be easily achieved. A desired simulation design can be achieved using the center coordinates of two circles for the optimum design in the egg type.

The advantages of the present invention will be described in detail.

(i) In the present invention, it is possible to achieve a common clothoid in one linearity and a continuous design irrespective of the egg type (forward direction, backward direction, S type, double egg type and multiple egg type).

(ii) In the present invention, it is possible to determine the accurate specification based on the simulation technique when the entrance and exist axes that are basic specifications and the center coordinate of the circle are provided as compared to the conventional art in which the conventional software programs need the accurate specification (parameter value, and the curvature and curve length). In the present invention, it is possible to achieve an accurate design within a few seconds or a few minutes by adapting the algorithm according to the present invention as compared to the conventional art in which the conventional softwares need a few tens of minutes or a few tens of hours. Therefore, in the present invention, it is possible to significantly decrease the design time period.

(iii) In addition, in the conventional softwares, only the entrance axis is given as a fixed coordinate, and it is impossible to give the exist axis a desired value, so that it is impossible to design based on the exist axis. However, in the present invention, it is possible to designate the entrance and exist axes and to design using the designated axes.

(iv) In the conventional software, it is impossible to design the egg type at one time. Namely, the egg type is classified into the separate elements such as straight line—clothoid—circular circle—clothoid—circular curve—straight line for thereby designating a design specification and a curving degree of a curve and straight line with respect to each element. However, in the present invention, it is possible to design the egg type at one time.

(v) Almost the softwares use CAD for a visual easiness. In this case, there are inconveniences for converting the file formats into the CAD files. However, in the present invention, it is possible to achieve a visible confirmation such as enlargement, contraction, movement, etc. in the same manner as the CAD on the screen without using the CAD program. In addition, it is possible to achieve the work directly on the CAD without any file format conversion.

(vi) The linearity that could not be processed in the conventional programs can pass through a certain position, so that the present invention could be very advantageous when there are any limits with respect to an obstacle, passage point, etc.

(vii) The present invention can be adapted to all types of road linearity designs and can be adapted irrespective of the main line and connection roads. In addition, it has a highest advantage in the circular curve and smoothing curve, in particular in the design of the egg type. The present invention is very useful when designing the egg type in the connection roads.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a method for designing a road, an improvement comprising calculating parameters $A_1$ and $A_2$ in an S-shaped clothoid with $R_1$, $R_2$, D and $$\frac{A_2}{A_1}$$

being known values and $R_1$ and $R_2$ being radii of two circles and $A_1$ and $A_2$ being clothoid parameters A adapted to $R_1$ and $R_2$, respectively, and D being a shortest distance between circumferential portions of two circles, a method for calculating the S-shaped clothoid parameter comprising:

a step in which an initial value of a tangential angle $\tau_1$ of the radius $R_1$ is set;

a step in which the tangential angle $\tau_1$ is compared with 0, and when a result of the comparison is less than 0, since it means there is no solution, the process is stopped, and when a result of the same is greater than 0, a value of $(R_1+D+R_2)^2 - X_M^2$ is calculated, $X_M$ being a function of an unknown value $\tau_1$;

a step in which a value of $(R_1+D+R_2)^2 - X_M^2$ is compared with 0, and when a result of the comparison is less than 0, $\tau_1$ is properly adjusted, and the routine goes back to the next step of setting the initial value of the tangential angle $\tau_1$, and when a result of the same is greater than 0, the function $F(\tau_1)$ is calculated and the function $F'(\tau_1)$ which is differentiated with $\tau_1$ from the function $F(\tau_1)$ is calculated;

a step in which a ratio $$G = \frac{F(\tau_1)}{F'(\tau_1)}$$

is calculated;

a step in which $\tau_1 = \tau_1 - G$ is calculated ($\tau_1$ is reduced by G); and a step in which an absolute value of G is compared with a tolerance of $10^{-6}$, and as a result of the comparison when the absolute value of G is greater than the tolerance, the routine is fed back to the next step where the initial value of $\tau_1$ is set, and when it is less than the tolerance, the tangential angle $\tau_1$ is determined, and $A_1$, which is a clothoid parameter A adapted to $R_1$, is easily calculated using $\tau_1$, and $A_2$, which is a clothoid parameter A adapted to $R_2$, is also easily calculated using $A_1$ and given value $$\frac{A_2}{A_1}.$$

2. The method of claim 1, wherein in said step for calculating $A_1$ and $A_2$ with functions $F(\tau_1)$ and $F'(\tau_1)$, with respect to $T_1$, when calculations are done for functions $F(L_1)$ and $F'(L_1)$ with respect to $L_1$, or with functions $F(\tau_2)$ and $F'(\tau_2)$ with respect to $\tau_2$, or with functions $F(L_2)$ and $F'(L_2)$ with respect to $L_2$, and values of $A_1$ and $A_2$ are obtained, a same result is obtained for $A_1$ and $A_2$.

3. The method of claim 1, wherein said step for calculating a solution of the functions $F(\tau_1)$ and $F'(\tau_1)$ based on a non-linear method is achieved using one selected from the group consisting of the Newton-Rapson equation method, bisection method, secant method, regular false method, Aitken method, successive substitution method, Bairstow's method, fixed point repeating method, Muller method or repeating method.

4. The method of claim 1, wherein said function of $F(\tau_1)$ is as follows:

$$F(\tau_1) = \frac{2}{3}R_1\left(\tau_1^2 - \frac{\tau_1^4}{14} + \frac{\tau_1^6}{440} - \frac{\tau_1^8}{25200}\right) +$$
$$\frac{2}{3}R_2\left((t\tau_1)^2 - \frac{(t\tau_1)^4}{14} + \frac{(t\tau_1)^6}{440} - \frac{(t\tau_1)^8}{25200}\right) +$$
$$R_1\mathrm{Cos}\tau_1 + R_2\mathrm{Cos}(t\tau_1) - \sqrt{(R_1+D+R_2)^2 - X_M^2}$$

wherein t represents a constant value, and $X_M$ is a function of an unknown value $\tau_1$.

5. The method of claim 1, wherein said function of $F'(\tau_1)$ is as follows:

$$F'(\tau_1) = \frac{2}{3}R_1\left(2\tau_1 - \frac{4\tau_1^3}{14} + \frac{6\tau_1^5}{440} - \frac{8\tau_1^7}{25200}\right) +$$

-continued $$\frac{2}{3}R_2\left(2t^2\tau_1 - \frac{4t^4\tau_1^3}{14} + \frac{6t^6\tau_1^5}{440} - \frac{8t^8\tau_1^7}{25200}\right) + R_1\mathrm{Sin}\tau_1 + R_2t\mathrm{Sin}(t\tau_1) +$$

$$\frac{X_M}{\sqrt{(R_1+D+R_2)^2 - X_M^2}} * \left\{2R_1\left(1 - \frac{3\tau_1^2}{10} + \frac{5\tau_1^4}{216} - \frac{7\tau_1^6}{9360}\right) - R_1\mathrm{Cos}\tau_1 + 2R_2t\left(1 - \frac{3(t\tau_1)^2}{10} + \frac{5(t\tau_1)^4}{216} - \frac{7(t\tau_1)^6}{9360}\right) - R_2t\mathrm{Cos}(t\tau_1)\right\}$$

where t represents a constant value, and $X_M$ represents a function of an unknown value $\tau_1$.

6. In a method for designing a road, an improvement comprising calculating A in an Egg-shaped clothoid with $R_1$, $R_2$, D being known values and $R_1$ being a radius of a larger circle and $R_2$ being a radius of a smaller circle and D being a shortest distance between circumferential portions of the two circles, a method for calculating an egg-shaped clothoid parameter, comprising:

a step in which an initial value of a tangential angle $\tau_1$ of the radius $R_1$ is set;

a step in which the tangential angle $\tau_1$ is compared with 0, and when a result of the comparison is less than 0, since it means there is no solution, the process is stopped, and when a result of the same is greater than 0, a value of $(R_1-R_2-D)^2-X_M^2$ is calculated, $X_M^2$ being a function of an unknown value $\tau_1$;

a step in which the value of $(R_1-R_2-D)^2-X_M^2$ is compared with 0, and when a result of the comparison is less than 0, $\tau_1$ is properly adjusted, and the routine goes back to the next step of setting the initial value of the tangential angle $\tau_1$, and when a result of the same is greater than 0, the function $F(\tau_1)$ is calculated and the function $F'(\tau_1)$ which is differentiated with $\tau_1$ from the function $F(\tau_1)$ is calculated;

a step in which a ratio $$G = \frac{F(\tau_1)}{F'(\tau_1)}$$

is calculated;

a step in which $\tau_1=\tau_1-G$ is calculated ($\tau_1$ is reduced by G); and a step in which an absolute value of G is compared with a tolerance of $10^{-6}$, and as a result of the comparison when the absolute value of G is greater than the tolerance, the routine is fed back to the next step where the initial value of $\tau_1$ is set, and when it is less than the tolerance, the tangential angle $\tau_1$ is determined, and the value of parameter A is easily calculated using the tangential angle $\tau_1$.

7. The method of claim 6, wherein said function $F(\tau_1)$ is as follows:

$$F(\tau_1) = \frac{2}{3}R_2\left\{(t\tau_1)^2 - \frac{(t\tau_1)^4}{14} + \frac{(t\tau_1)^6}{440} - \frac{(t\tau_1)^8}{25200}\right\} -$$

$$\frac{2}{3}R_1\left(\tau_1^2 - \frac{\tau_1^4}{14} + \frac{\tau_1^6}{440} - \frac{\tau_1^8}{25200}\right) + R_2\mathrm{Cos}(t\tau_1) -$$

$$R_1\mathrm{Cos}\tau_1 + \sqrt{(R_1+R_2+D)^2 - a^2}$$

where t represents a constant value, and a represents $$2R_2\left\{(t\tau_1) - \frac{(t\tau_1)^3}{10} + \frac{(t\tau_1)^5}{216} - \frac{(t\tau_1)^7}{9360}\right\} -$$

$$R_2\mathrm{Sin}(t\tau_1) - \left\{2R_1\left(\tau_1 - \frac{\tau_1^3}{10} + \frac{\tau_1^5}{216} - \frac{\tau_1^7}{9360}\right) - R_1\mathrm{Sin}\tau_1\right\}$$

8. The method of claim 6, wherein said function of $F'(\tau_1)$ is as follows:

$$F'(\tau_1) = \frac{2}{3}R_2\left(2t^2\tau_1 - \frac{4t^4\tau_1^3}{14} + \frac{6t^6\tau_1^5}{440} - \frac{8t^8\tau_1^7}{25200}\right) -$$

$$\frac{2}{3}R_1\left(2\tau_1 - \frac{4\tau_1^3}{14} + \frac{6\tau_1^5}{440} - \frac{8\tau_1^7}{25200}\right) + R_2t\mathrm{Sin}(t\tau_1) +$$

$$R_1\mathrm{Sin}\tau_1 - \frac{X_M}{\sqrt{(R_1+R_2+D)^2 - X_M^2}} *$$

$$\begin{bmatrix} 2R_2\left\{t - \frac{3t^3\tau_1^2}{10} + \frac{5t^5\tau_1^4}{216} - \frac{7t^7\tau_1^6}{9360}\right\} - tR_2\mathrm{Cos}(t\tau_1) - \\ 2R_1\left(1 - \frac{3\tau_1^2}{10} + \frac{5\tau_1^4}{216} - \frac{7\tau_1^6}{9360}\right) + R_1\mathrm{Cos}\tau_1 \end{bmatrix}$$

where $X_M=X_{M2}-X_{M1}$, t represents a constant value, and $X_M$ represents a function of an unknown value $\tau_1$.

9. The method of claim 6, wherein said step for calculating a solution of the functions of $F(\tau_1)$ and $F'(\tau_1)$ based on a non-linear method is achieved using one selected from the group consisting of the Newton-Rapson equation method, bisection method, secant method, regular false method, Aitken method, successive substitution method, Bairstow's method, fixed point repeating method, Muller method or repeating method.

10. The method of claim 6, wherein in said step for calculating A with functions $F(\tau_1)$ and $F'(\tau_1)$ with respect to $\tau_1$, when A is calculated with functions of $F(\tau_1)$, $F'(\tau_1)$ with respect to $L_1$, or with functions of $F(\tau_2)$, $F'(\tau_2)$ with respect to $\tau_2$, or with functions of $F(L_2)$, $F'(L_2)$ with respect to $L_2$, and a value of A is obtained, a same result for A is obtained.

* * * * *

UNITED STATES PATENT AND TRADEMARK OFFICE
CERTIFICATE OF CORRECTION

PATENT NO.        : 7,010,412 B1                                Page 1 of 1
APPLICATION NO. : 11/015932
DATED             : March 7, 2006
INVENTOR(S)       : Gyu-Suk Song It is certified that error appears in the above-identified patent and that said Letters Patent is hereby corrected as shown below:

<u>Title page,</u>
Item [75], Inventor, delete "Gyu-Seok Song, Sungdong-gu" and substitute --Gyu-Suk Song, Nowon-gu--.

Signed and Sealed this

Twenty-fourth Day of July, 2007

JON W. DUDAS
*Director of the United States Patent and Trademark Office*